US012655819B2

(12) United States Patent　　(10) Patent No.:　US 12,655,819 B2
Gilge et al.　　　　　　　　　　(45) Date of Patent:　　Jun. 16, 2026

---

(54) VEHICLE AIRFLOW SYSTEM

(71) Applicant: ARCTIC CAT INC., Thief River Falls, MN (US)

(72) Inventors: Brent Thomas Gilge, Bemidji, MN (US); Ryan John Hughes, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 15 days.

(21) Appl. No.: 18/776,062

(22) Filed: Jul. 17, 2024

(65) Prior Publication Data

US 2024/0369031 A1　　Nov. 7, 2024

Related U.S. Application Data

(63) Continuation of application No. 17/867,363, filed on Jul. 18, 2022, now Pat. No. 12,473,879, which is a (Continued)

(51) Int. Cl.
　　*F02M 35/16*　　　　(2006.01)
　　*F02M 35/04*　　　　(2006.01)
　　　　　　(Continued)

(52) U.S. Cl.
　　CPC .... *F02M 35/162* (2013.01); *F02M 35/10078* (2013.01); *F02M 35/161* (2013.01);
　　　　　　(Continued)

(58) Field of Classification Search
　　None
　　See application file for complete search history.

(56) References Cited

U.S. PATENT DOCUMENTS 4,531,606 A　*　7/1985　Watanabe　.............. B62K 5/027
　　　　　　　　　　　　　　　　　　　180/215
4,593,656 A　*　6/1986　Shibata　................... F02B 27/00
　　　　　　　　　　　　　　　　　　　180/219

(Continued)

FOREIGN PATENT DOCUMENTS

AU　　2004233475 B2　*　10/2010　......... F02M 35/1233
CN　　202806876 U　*　3/2013
　　　　　　(Continued)

OTHER PUBLICATIONS

""1668 Oldsmobile 442 Hurst Brochure", [Online]. Retrieved from the Internet: <URL: http://www.lov2xlr8.no/brochures/olds/hurst1/hurst1.html>, (1968), 3 pgs."

(Continued)

*Primary Examiner* — Kevin R Steckbauer

(74) *Attorney, Agent, or Firm* — Billion & Armitage

(57)　　　　　ABSTRACT

A vehicle including an airflow system defining an air passageway to facilitate airflow to or from an engine component. The airflow system includes a noise control mechanism, such as an attenuator or a tortuous portion of the air passageway, for reducing or otherwise controlling noise associated with the engine component. Positioning and orientation of various inlets provides additional noise reduction for passengers of the vehicle.

23 Claims, 13 Drawing Sheets

Related U.S. Application Data continuation of application No. 15/239,320, filed on Aug. 17, 2016, now Pat. No. 11,391,253.

(60) Provisional application No. 62/205,973, filed on Aug. 17, 2015.

(51) Int. Cl.
*F02M 35/10* (2006.01)
*F16H 57/04* (2010.01)

(52) U.S. Cl.
CPC ......... *F16H 57/0416* (2013.01); *F02M 35/04* (2013.01); *F02M 35/048* (2013.01)

(56) References Cited

U.S. PATENT DOCUMENTS

| | | | | |
|---|---|---|---|---|
| 4,600,074 A * | 7/1986 | Watanabe | B60K 17/34 180/251 |
| 5,086,858 A * | 2/1992 | Mizuta | F02M 35/162 55/385.3 |
| 5,096,010 A * | 3/1992 | Ojala | F02M 35/1266 123/184.56 |
| 5,119,718 A * | 6/1992 | Wagner | B60H 1/00378 55/433 |
| 5,137,080 A * | 8/1992 | Haasch | F28F 9/262 165/69 |
| 5,240,088 A * | 8/1993 | Okui | F02B 75/20 123/196 R |
| 5,692,578 A * | 12/1997 | Miyakawa | B62J 35/00 280/833 |
| 6,009,705 A * | 1/2000 | Arnott | G10K 11/172 60/322 |
| 6,142,123 A * | 11/2000 | Galasso | F02B 61/02 477/109 |
| 6,604,506 B2 * | 8/2003 | Tanaka | F02D 9/1095 123/184.52 |
| 6,691,661 B2 * | 2/2004 | Lundgreen | F02M 35/10078 123/184.31 |
| 6,705,417 B2 * | 3/2004 | Kitai | B62J 50/30 123/41.62 |
| 6,840,206 B2 * | 1/2005 | Yasui | F02M 35/1227 123/184.53 |
| 6,959,934 B2 * | 11/2005 | Rioux | F02M 35/10144 180/68.3 |
| 7,168,516 B2 * | 1/2007 | Nozaki | F02M 35/04 123/41.58 |
| 7,234,555 B2 * | 6/2007 | Khouw | F02M 35/10262 180/69.2 |
| 7,237,635 B2 * | 7/2007 | Khouw | F02M 35/10262 180/68.3 |
| 7,258,186 B2 * | 8/2007 | Okabe | B62K 19/20 180/219 |
| 7,263,962 B2 * | 9/2007 | Ohara | F02M 35/04 123/184.53 |
| 7,448,353 B2 * | 11/2008 | Shinada | F02M 35/161 123/184.53 |
| 7,458,343 B2 * | 12/2008 | Tanabe | F02M 35/1019 123/41.7 |
| 7,506,712 B2 * | 3/2009 | Kato | B60K 13/02 180/68.1 |
| 7,650,959 B2 * | 1/2010 | Kato | B60G 7/02 180/311 |
| 7,690,462 B2 * | 4/2010 | Kato | B60K 13/02 180/68.1 |
| 7,712,562 B2 * | 5/2010 | Nozaki | B60K 13/02 180/68.3 |
| 7,882,912 B2 * | 2/2011 | Nozaki | F02M 35/02 180/291 |
| 7,981,179 B2 * | 7/2011 | Nobuhira | B62J 40/00 55/385.3 |
| 8,002,061 B2 * | 8/2011 | Yamamura | B60K 11/00 180/68.1 |
| 8,127,878 B2 * | 3/2012 | Teraguchi | B60K 13/02 180/68.1 |
| 8,205,699 B2 * | 6/2012 | Ohzono | F02M 35/161 180/69.2 |
| 8,251,170 B2 * | 8/2012 | Miura | B60K 13/02 180/68.1 |
| 8,459,727 B2 * | 6/2013 | Mayr | B60H 1/0055 454/144 |
| 8,544,582 B2 * | 10/2013 | Kaku | B60K 11/06 180/68.1 |
| 8,556,015 B2 * | 10/2013 | Itoo | B60K 11/08 180/68.1 |
| 8,596,406 B2 * | 12/2013 | Itoo | F16H 57/0416 474/93 |
| 8,607,908 B2 * | 12/2013 | Siber | F02M 35/161 180/68.3 |
| 8,613,335 B2 * | 12/2013 | Deckard | F16H 57/027 180/68.1 |
| 8,613,336 B2 * | 12/2013 | Deckard | B60K 17/08 180/68.3 |
| 8,613,337 B2 * | 12/2013 | Kinsman | B60L 50/16 180/68.3 |
| 8,646,438 B2 * | 2/2014 | Saeki | F02M 35/10118 123/184.56 |
| 8,657,050 B2 | 2/2014 | Yamaguchi | |
| 8,746,719 B2 * | 6/2014 | Safranski | B60K 17/348 280/124.152 |
| 8,827,019 B2 * | 9/2014 | Deckard | B60K 17/08 180/69.24 |
| 8,827,020 B2 * | 9/2014 | Deckard | B60K 17/08 180/68.1 |
| 8,827,028 B2 * | 9/2014 | Sunsdahl | B62D 21/183 |
| 8,851,230 B2 * | 10/2014 | Ono | F01N 1/089 181/227 |
| 9,046,065 B2 * | 6/2015 | Chang | F02M 35/10262 |
| 9,121,333 B2 * | 9/2015 | Shibata | F01P 1/00 |
| 9,211,924 B2 * | 12/2015 | Safranski | B60G 3/20 |
| 9,217,501 B2 * | 12/2015 | Deckard | B62D 33/02 |
| 9,288,942 B2 * | 3/2016 | Moriguchi | B60L 1/003 |
| 9,365,251 B2 * | 6/2016 | Safranski | B60K 17/354 |
| 9,382,883 B2 | 7/2016 | Nishizawa et al. | |
| 9,512,809 B2 * | 12/2016 | Tsumiyama | F02M 35/162 |
| 9,540,052 B2 * | 1/2017 | Burt, II | B62D 23/005 |
| 9,694,648 B2 * | 7/2017 | Reder | B60H 1/243 |
| 9,739,245 B2 | 8/2017 | Yamashita et al. | |
| 9,932,073 B2 * | 4/2018 | Dube | B60K 13/02 |
| 9,969,259 B2 * | 5/2018 | Safranski | B60K 17/00 |
| 10,071,655 B2 * | 9/2018 | Ito | B62D 21/04 |
| 10,131,206 B1 * | 11/2018 | Kirkpatrick | B60H 1/00407 |
| 10,160,497 B2 * | 12/2018 | Wimpfheimer | B60G 3/20 |
| 10,337,474 B1 * | 7/2019 | Wilson, III | F02M 35/10013 |
| 10,369,886 B2 * | 8/2019 | Safranski | B60G 7/006 |
| 10,391,859 B2 * | 8/2019 | Kuramoto | B60K 13/02 |
| 10,399,435 B2 * | 9/2019 | Bastien | B60K 15/03504 |
| 10,711,737 B2 * | 7/2020 | Reedy | F02M 25/089 |
| 10,774,797 B2 * | 9/2020 | Miki | F02M 35/10052 |
| 10,864,799 B1 * | 12/2020 | Kirkpatrick | B62D 23/005 |
| 10,981,448 B2 * | 4/2021 | Safranski | B60K 17/00 |
| 10,995,843 B2 * | 5/2021 | Bessho | F16H 57/035 |
| 11,077,910 B2 * | 8/2021 | Pelz | B62J 17/04 |
| 11,092,229 B2 * | 8/2021 | Matsudo | B60K 17/04 |
| 11,273,881 B2 * | 3/2022 | Deckard | B60G 3/202 |
| 11,293,540 B2 * | 4/2022 | Leclair | F02M 35/162 |
| 11,318,830 B2 * | 5/2022 | Iwata | F02M 35/0204 |
| 11,391,253 B1 * | 7/2022 | Gilge | B60K 13/02 |
| 11,391,361 B2 * | 7/2022 | Leclair | F16H 57/0489 |
| 2002/0073961 A1 * | 6/2002 | Tanaka | F02M 35/10072 123/184.42 |
| 2002/0112905 A1 * | 8/2002 | Kitai | B60K 11/06 180/68.1 |
| 2003/0140882 A1 * | 7/2003 | Lundgreen | F02B 61/02 123/184.31 |
| 2003/0213628 A1 * | 11/2003 | Rioux | F02M 35/10144 180/68.3 |
| 2003/0226536 A1 * | 12/2003 | Yasui | F02M 35/10013 123/184.53 |

(56) References Cited

U.S. PATENT DOCUMENTS

| | | | | |
|---|---|---|---|---|
| 2004/0139728 A1* | 7/2004 | Tanabe | F02M 27/02 | 60/274 |
| 2005/0217908 A1* | 10/2005 | Rini | B60K 13/02 | 180/68.1 |
| 2005/0263334 A1* | 12/2005 | Okabe | B62K 19/12 | 180/219 |
| 2006/0006011 A1* | 1/2006 | Khouw | B60K 13/02 | 180/68.3 |
| 2006/0006012 A1* | 1/2006 | Khouw | F02M 35/04 | 180/68.3 |
| 2007/0012276 A1* | 1/2007 | Ohara | F02M 35/04 | 123/184.57 |
| 2007/0045029 A1* | 3/2007 | Nozaki | F02M 35/162 | 180/300 |
| 2007/0131189 A1* | 6/2007 | Shinada | F02M 35/1272 | 123/184.57 |
| 2008/0023240 A1* | 1/2008 | Sunsdahl | B60K 17/35 | 180/312 |
| 2009/0050095 A1* | 2/2009 | Nobuhira | F02M 35/162 | 55/290 |
| 2010/0078240 A1* | 4/2010 | Miura | B60K 13/02 | 180/68.3 |
| 2010/0140004 A1* | 6/2010 | Ohzono | F02M 35/10144 | 180/68.3 |
| 2010/0170734 A1* | 7/2010 | Teraguchi | B60K 13/02 | 180/68.3 |
| 2010/0187032 A1* | 7/2010 | Yamamura | B60K 11/00 | 180/68.2 |
| 2011/0094818 A1* | 4/2011 | Suzuki | B60K 5/02 | 180/292 |
| 2011/0241380 A1* | 10/2011 | Mayr | B60H 1/00378 | 296/190.09 |
| 2012/0031688 A1* | 2/2012 | Safranski | B60K 17/34 | 280/124.135 |
| 2012/0031693 A1* | 2/2012 | Deckard | B23P 6/00 | 180/68.3 |
| 2012/0031694 A1* | 2/2012 | Deckard | F16H 57/0489 | 29/402.03 |
| 2012/0085307 A1* | 4/2012 | Siber | F02M 35/088 | 123/184.21 |
| 2012/0186887 A1* | 7/2012 | Moriguchi | B60L 58/15 | 180/65.1 |
| 2012/0260896 A1* | 10/2012 | Saeki | F02B 33/40 | 123/559.1 |
| 2013/0056292 A1* | 3/2013 | Kinsman | B62D 33/02 | 180/68.3 |
| 2013/0087396 A1* | 4/2013 | Itoo | F02M 35/162 | 180/68.3 |
| 2013/0087402 A1* | 4/2013 | Kaku | B60K 13/04 | 180/68.1 |
| 2013/0087403 A1* | 4/2013 | Itoo | F16H 57/035 | 180/339 |
| 2013/0104832 A1* | 5/2013 | Chang | F02M 35/10013 | 123/184.21 |
| 2014/0060963 A1* | 3/2014 | Ono | F01N 1/089 | 181/228 |
| 2014/0102819 A1* | 4/2014 | Deckard | F16H 57/0489 | 180/339 |
| 2014/0102820 A1* | 4/2014 | Deckard | F16H 57/0416 | 29/402.01 |
| 2014/0123919 A1* | 5/2014 | Shibata | F01N 3/32 | 123/41.56 |
| 2014/0203533 A1* | 7/2014 | Safranski | B60G 7/008 | 280/124.135 |
| 2014/0374179 A1* | 12/2014 | Deckard | B60K 13/06 | 180/68.3 |
| 2015/0047917 A1* | 2/2015 | Burt, II | B62D 25/2036 | 180/68.5 |
| 2015/0090515 A1* | 4/2015 | Safranski | B60G 7/008 | 180/348 |
| 2017/0043680 A1* | 2/2017 | Ito | B60R 21/13 | |
| 2017/0106747 A1* | 4/2017 | Safranski | B60K 17/354 | |
| 2018/0056783 A1* | 3/2018 | Safranski | B60G 7/008 | |
| 2018/0163841 A1* | 6/2018 | Bessho | F16H 9/18 | |
| 2019/0048832 A1* | 2/2019 | Reedy | B60K 15/03504 | |
| 2019/0120366 A1* | 4/2019 | Leclair | F02M 35/162 | |
| 2019/0176613 A1* | 6/2019 | Bastien | B60K 15/03504 | |
| 2019/0337380 A1* | 11/2019 | Bastien | B60K 15/03504 | |
| 2020/0158056 A1* | 5/2020 | Miki | B62K 19/30 | |
| 2020/0158057 A1* | 5/2020 | Miki | B01D 46/0045 | |
| 2020/0164742 A1* | 5/2020 | Safranski | B60G 3/14 | |
| 2020/0208731 A1* | 7/2020 | Matsudo | B60K 35/50 | |
| 2021/0115884 A1* | 4/2021 | Ketterhagen | F02M 35/08 | |
| 2021/0188084 A1* | 6/2021 | Safranski | B60K 17/354 | |
| 2021/0331580 A1* | 10/2021 | Iwata | B60K 13/02 | |
| 2022/0349368 A1* | 11/2022 | Gilge | F02M 35/161 | |
| 2024/0359551 A1* | 10/2024 | Klaphake | B60K 13/04 | |
| 2024/0369031 A1* | 11/2024 | Gilge | F16H 57/0416 | |

FOREIGN PATENT DOCUMENTS

| | | | | |
|---|---|---|---|---|
| CN | 106184101 A | * | 12/2016 | B60R 21/13 |
| JP | 63101187 A | | 5/1988 | |
| JP | 09193874 A | | 7/1997 | |
| JP | 2015080997 A | * | 4/2015 | |
| JP | 5865224 B2 | * | 2/2016 | B60K 13/02 |

OTHER PUBLICATIONS

""Muscle Car Drive: 1968_hurst_olds_motor.jpg", http://www.musclecardrive.com/oldsmobile/images /, [Online]. Retrieved from the Internet: <URL: http://www.musclecardrive.com/oldsmobile/images/1968_hurst_olds_motor.jpg>, (Accessed on Jun. 24, 2015), 1 pg."

* cited by examiner

VEHICLE AIRFLOW SYSTEM

CROSS-REFERENCE TO RELATED APPLICATIONS

This application is a continuation application of U.S. patent application Ser. No. 17/867,363, filed Jul. 18, 2022, which is a continuation of U.S. patent application Ser. No. 15/239,320, filed Aug. 17, 2016, now U.S. Pat. No. 11,391, 253, which claims priority pursuant to 35 U.S.C. 119 (e) to U.S. Provisional Patent Application Ser. No. 62/205,973, filed Aug. 17, 2015, the entire disclosures of which are incorporated herein by reference.

FIELD OF THE INVENTION

This document pertains generally, but not by way of limitation, to air intakes and exhausts.

BACKGROUND

Air intakes are used with vehicle engine components including engines (internal combustion engines, hybrid motors, electrical motors, natural gas based motors and other alternative energy motors) and transmissions to provide cooling air or combustion air to facilitate the operation of the components. In one example, an air intake includes duct-work extending through portions of the vehicle forward of the engine component to provide a clean and relatively cool source of air for the engine component. For instance, in an example, an intake port is provided in front of an engine to separate the intake air from exhaust air that is heated or includes exhaust components that are unsuitable for use by an engine component.

In another example, a vehicle includes an intake port in close proximity to an engine component, for instance near a cargo area of the vehicle. The ductwork extends from the intake port near the cargo area to the engine component. In yet another example, the vehicle includes a transmission intake port and associated transmission air ductwork extending from one side of a vehicle to a transmission such as a continuous variable transmission. The vehicle includes an engine intake port and associated engine air ductwork extending from the other side of the vehicle to the engine (e.g., to provide piston air for an internal combustion engine).

SUMMARY

The present inventors have recognized, among other things, that a problem to be solved can include minimizing the fouling of intake air for an engine component while at the same time minimizing noise for vehicle occupants. For instance, some example air intake systems include an intake within a vehicle cabin to provide an isolated source of air to an engine component (e.g., internal combustion engine, electric, hybrid, natural gas, continuous variable transmission (CVT) etc.). While the air is, for the most part, free of particulate, exhaust and the like, engine noise is directed into the vehicle cabin through the ductwork and intake port. In other examples, air intake systems include an intake port provided on a vehicle exterior, for instance at a rear portion of the vehicle near one or more of the cargo area, the engine and rear wheels. In riding and driving conditions it is possible to foul the intake port and even allow the ingress of particulate, water, mud or the like.

In an example, the present subject matter can provide a solution to this problem, such as by providing a vehicle including an air intake system having one or more intake ports provided outside of the vehicle cabin. As described herein, the one or more intake ports open away from the vehicle cabin and thereby accordingly direct engine noise (e.g., from one or more engine components) away from the vehicle as well as the associated rider or driver (and passengers). In one example, the one or more intake ports are provided in front of the vehicle cabin (and outside of the cabin) and are coupled with the engine component with a passage (e.g., ductwork, frame component or the like). The forward position of the one or more intake ports isolates the port (or ports) from particulate (grime, flying mud and debris), exhaust, water or the like otherwise more prevalent toward the rear of the vehicle while at the same time directing engine noise away from the vehicle cabin including a rider, passenger or the like. Accordingly, fouling of the one or more intake ports is minimized while engine noise heard by the rider or passenger is also minimized.

In still another example, the one or more intake ports include a plurality of intake ports such as first and second intake ports for the one or more engine components. As described herein, a first intake port is provided on a first side of the vehicle (e.g., one or more of in front of or outside the vehicle cabin) and a second intake port is provided on a second side of the vehicle (e.g. an opposed side). By providing two or more ports that feed air to the engine component (or components) fouling of one of the ports by water, particulate or the like will not preclude the flow of air to the engine component. Accordingly, even in an extreme off road environment (mudding, creeks, streams and the like) where one of the ports is fouled the other port remains open to allow continued operation of the vehicle.

The present inventors have recognized, among other things, that another problem to be solved can include minimizing the ductwork for an air intake system. As described herein, in some examples one or more intake ports are positioned forwardly and outside of a vehicle cabin to minimize engine noise to the rider and passenger while at the same time minimizing fouling of the intake ports. Vehicles such as ATVs, ROVs, side by side ATVs and the like include engine components such as a power source (e.g., engine) or continuous variable transmission at least partially behind the vehicle cabin. Accordingly, passages for intake air are needed to transport air from the intake ports (e.g., in front of the vehicle cabin) to the engine components toward the rear of the vehicle. Space is at a premium in vehicles and ductwork extending through the vehicle assumes at least some space.

In an example, the present subject matter can provide a solution to this problem, such as by providing a vehicle including an air intake system having at least one frame component with an engine air passage. The one or more intake ports communicate with the engine air passage and the passage directs air to the engine component. Where two or more intake ports are provided the ports are in one example located on the same frame component. In another example, the two or more intake ports are located on differing frame components. The one or more engine frame components deliver intake air to the engine component (e.g., a power source such as an engine, continuous variable transmission or the like). Optionally, the one or more engine frame components are coupled with the engine component with an intake duct. The one or more engine frame components allow for the routing of engine air from almost any location of the vehicle that includes a tubular frame component. Stated another way, with a vehicle frame including a plurality tubular frame components intake ports are formed on any number of the frame components and the engine air passages are used to route the engine air to the engine components, optionally with a supplemental intake duct.

The consolidation of intake passages with the vehicle frame minimizes the overall profile of the air intake system relative to the vehicle and thereby saves space in the vehicle for other components while at the same time allowing for remote positioning of the intake ports, for instance toward the front of the vehicle (e.g., in front of the vehicle cabin). Space savings are further realized with two or more intake ports that are located at different portions of the vehicle and that use frame components as opposed to supplemental ductwork to connect the ports with the engine component. Further, components of the air intake system (and the corresponding cost) are minimized as one or more frame components are optionally used to deliver intake air.

This overview is intended to provide an overview of subject matter of the present patent application. It is not intended to provide an exclusive or exhaustive explanation of the invention. The detailed description is included to provide further information about the present patent application.

BRIEF DESCRIPTION

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
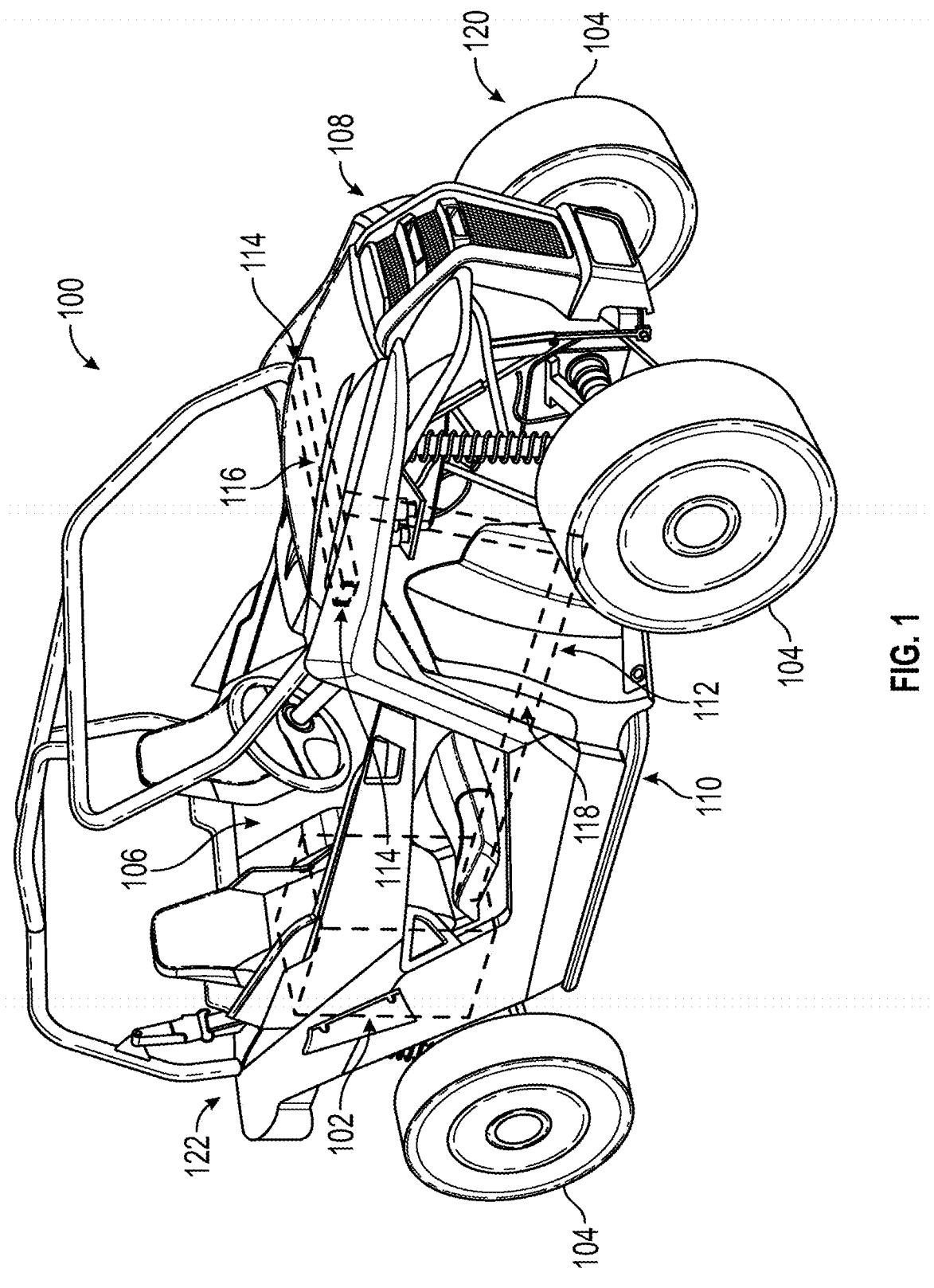
FIG. 1 is a perspective view of a vehicle.

FIG. 1 shows one example of a vehicle 100. As shown the vehicle 100, in one example, is an ATV, such as a side-byside ATV (also known as recreational off-road vehicle (ROV)). In another example, the vehicle 100 as described herein includes, but is not limited to, one or more of an ATV, a side-by-side ATV or ROV, snowmobile, power sport vehicle or the like. Referring again to FIG. 1, the vehicle 100 is shown with at least one engine component 102 including one or more of an engine, an internal combustion engine, a transmission, a continuous variable transmission or the like. The one or more engine components 102 are provided in one example in the vehicle rear portion of 122. In another example, the one or more of the engine components 102 are provided in the vehicle front portion 120. In yet another example, one or more of the engine components 102 are provided in one or both of the vehicle rear portion 122 or the vehicle front portion 120.

As further shown in FIG. 1, the vehicle 100 includes a first vehicle side 108 and a second vehicle side 110. In one example, the first and second vehicle sides 108, 110 correspond to the left and right sides of the vehicle 100. In another example, the first and second vehicle sides 108, 110 correspond to other side portions of the vehicle 100 including portions (and not necessarily the entirety), of one or more of the left and right sides, top and bottom sides, front and rear sides of the vehicle 100 or the like. As shown in FIG. 1, a plurality of ground engaging members 104 are provided with the vehicle 100. As shown in FIG. 1, the ground engaging members 104 include wheels and optionally include tires coupled with the wheels. In other examples, the ground engaging members include, but are not limited to, one or more of wheels, skis, tracks or the like. The ground engaging members 104 are operatively coupled with one or more of the engine components 102. The engine components 102 provide power to one or more of the ground engaging members 104 to accordingly provide motive power to the vehicle 100.

As will be described in detail herein, the vehicle 100, in an example, includes an intake system 112 that provides air to the one or more engine components 102. Referring again to FIG. 1, the intake system 112 is shown in broken lines within the vehicle 100. The intake system 112, in one example, includes an intake duct 118 extending from an engine component 102 toward the vehicle front portion 120. For instance, as shown the intake duct 118, in one example, extends beneath or through a vehicle cabin 106 of the vehicle 100. The intake duct 118 extends to the vehicle front portion 120 and, in one example, splits, for instance, toward two or more intake ports 114. As shown in FIG. 1, the intake duct 118, in another example, is coupled with an engine air passage 116 that provides fluid communication from the intake ports 114 to the intake duct 118. In the example shown in FIG. 1, a first intake port 114 is provided on the first vehicle side 108 and a second intake port 114 is provided on another side of the vehicle 100 including, for example, the second vehicle side 110. As previously described, in other embodiments the vehicle sides include one or more of portions of the left, ride, top, bottom, front and rear sides of the vehicle 100.

The intake system 112 shown in FIG. 1, and in other examples described herein, provides intake air to one or more engine components 102 of the vehicle 100. For instance, the intake system 112 provides air to one or more of a continuous variable transmission, an engine (for internal combustion), cooling air or the like to one or more engine components 102. In another example, the intake system 112 provides air to a plurality of engine components 102 including, but not limited to, an engine, a continuous variable transmission, transmission or the like. One or more intake ports 114 are provided forward of the vehicle cabin 106 and are directed away from the vehicle cabin 106 (e.g., outwardly relative to the vehicle 100) to provide a clean, cool stream of air to the engine components 102. For instance, with the intake ports 114 provided within the vehicle front portion 120 the intake ports 114 are able to provide unfouled air (e.g., substantially free of particulate, smoke, mud, water or the like) to the engine components 102 arranged at the vehicle rear portion 122. In another example, where the intake system 112 includes a plurality of intake ports 114 (as opposed to another example with the intake system 112 including a single intake port 114) a first intake port 114 is on a first vehicle side 108 and a second intake port 114 is on a second vehicle side 110. Accordingly, if one of the intake ports 114 is fouled (e.g., partially or fully blocked with water, mud, particulate or the like) the other opposed intake port 114 in most situations remains open to ensure a consistent flow of air to the associated engine components 102.

Figure 2:
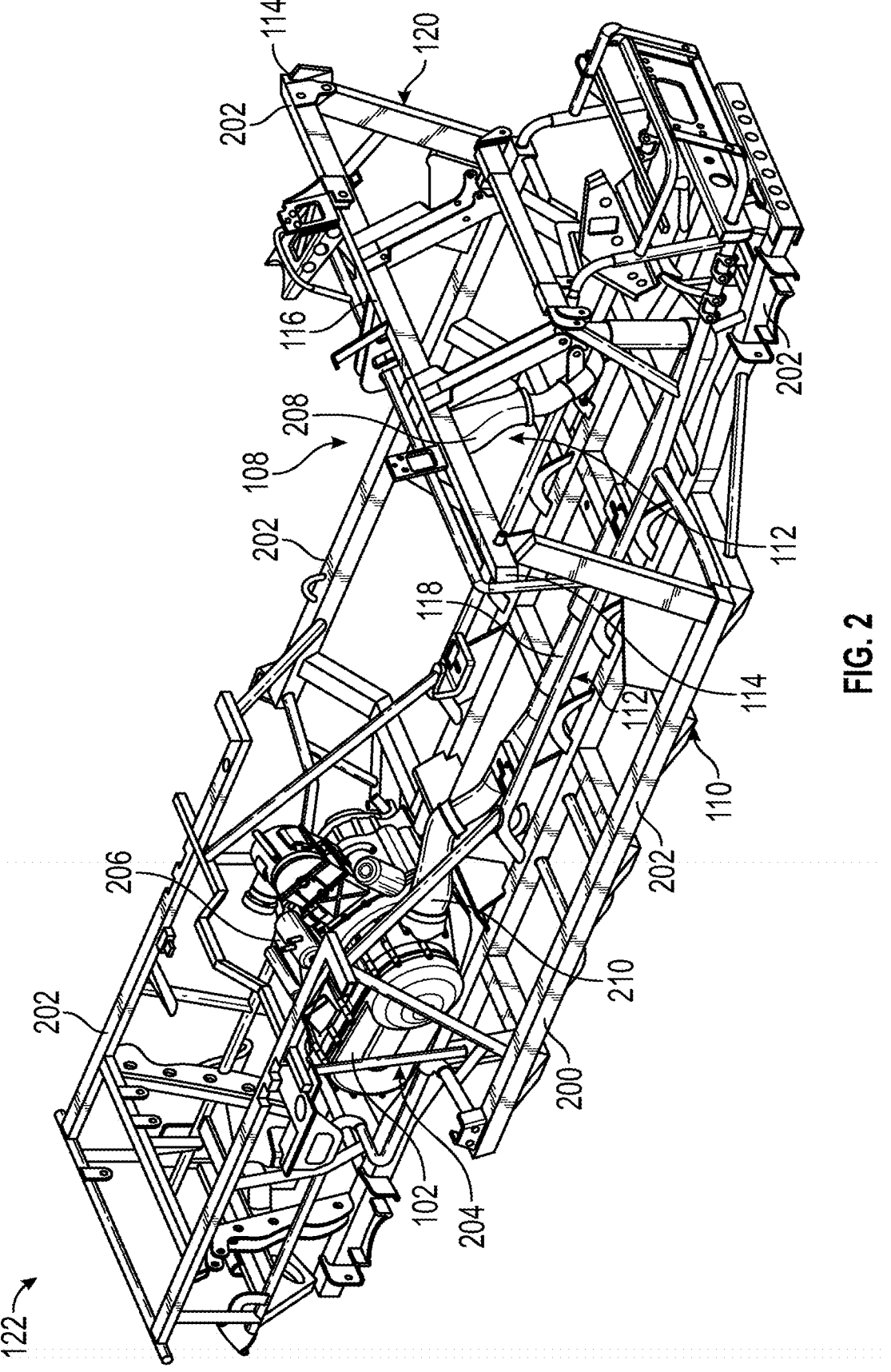
FIG. 2 is a perspective view of a vehicle frame including one example of an air intake system.

The intake system 112 is described in detail herein. As shown in FIGS. 1 and 2, the intake system 112 includes the intake duct 118 extending from the engine component 102 to the engine air passage 116. The intake duct 118 communicates with the engine air passage 116 and the engine air passage 116 communicates in turn with the one or more intake ports 114. As shown in the example of FIG. 1, the one or more intake ports 114 are, in one example, positioned forward of the vehicle cabin 106. In another example, the intake ports 104 are directed away from the vehicle cabin 106 to thereby attenuate noise otherwise directed toward a driver and passenger within the vehicle cabin. With the intake ports 114 forward of the vehicle cabin 106, the intake ports receive clean air relative to air otherwise received, for instance, at the vehicle rear portion 122. At the vehicle rear portion 122 mud, water, particulate or the like are thrown into the air by the operation of the engine components 102 and the rearward ground engaging members 104. Generally speaking, less particulate, mud or water is disturbed by the ground engaging members 104 at the vehicle front portion 120 (and if disturbed is directed at least partially toward the vehicle rear portion 122). Accordingly, the vehicle front portion 120 provides a relatively clean source of air in contrast to the vehicle rear portion 122.

FIG. 2 shows another view of a portion of the vehicle 100 including, for instance, the vehicle frame 200. As shown, the vehicle frame is comprised of a plurality of frame components 202 that provide the overall framework for the vehicle 100. As shown in FIG. 2, a plurality of frame components 202 are provided at the vehicle rear portion 122, the vehicle front portion 120, the portions of the frame corresponding to the vehicle cabin 106 and the first and second vehicle sides 108, 110. In some examples, the frame components 202 include one or more tubular frame components, for instance, square tubes, round tubes or the like extending through the vehicle 100.

As further shown in FIG. 2, the engine components 102, in one example, include an engine 206, a transmission, such as a continuous variable transmission 204. In the example shown in FIG. 2, the engine components 102 are provided within the vehicle rear portion 122, for instance, behind the vehicle cabin 106. The intake duct 118 (previously shown in broken lines in FIG. 1) extends from an engine component intake port 210 forward to the vehicle front portion 120. As further shown, the intake duct 118 extends to the engine air passage 116 and is in communication with the engine air passage 116 at a duct port 208. One or more intake ports 114 (in this example, two intake ports 114) are provided at opposed ends of the engine air passage 116. As shown, the engine air passage 116 extends to the left and right of the duct port 208 to each of the intake ports 114. Accordingly, the intake ports 114 provide intake air to the intake duct 118 through the engine air passage 116 and the duct port 208 to provide intake air to one or more of the engine components 102 (e.g., one or more of a transmission 204, engine 206 other engine component or the like).

As further shown in the example of FIG. 2, in one example, the engine air passage 116 is included as part of one of the frame components 202 of the vehicle frame 200. For instance, the frame component 202 shown in FIG. 2 extends to the left and right of the duct port 208 and provides the engine air passage 116. The intake ports 114 are provided near either end of the frame component 202. Accordingly, the frame component 202 besides providing a structural component also provides a tubular duct, passage or the like for the engine air passage 116 to thereby facilitate the delivery of intake air to the duct port 208 and the intake duct 118 for eventual use at the one or more engine components 102 including, but not limited to, the CVT 204, the engine 206 or the like.

In another example, the engine air passage 116 is associated with another member, for instance, a non-framed component coupled with the vehicle frame 200. For instance, one or more of a tube, duct, flexible tubing, flexible ducting or the like extends from the duct port 208 to the one or more intake ports 114. FIG. 2 shows the intake ports 114 at the first and second vehicle sides 108, 110. In another example, however, the intake ports 114 are provided at different locations relative to the positions shown in FIG. 2. For instance, in one example, the intake ports 114 provided on an upper hood portion or near an upper hood portion of the vehicle 100 (e.g., consider another example of a vehicle side). In another example, the intake ports 114 are positioned more centrally relative to the positions shown in FIG. 2, for instance, to either side of the duct port 208. As will be shown herein, the spacing, in one example, between the duct port 208 and the intake ports 114 is, in one example, varied according to the construction of the vehicle, desired positioning of the intake ports 114 or the like.

Figure 3A:
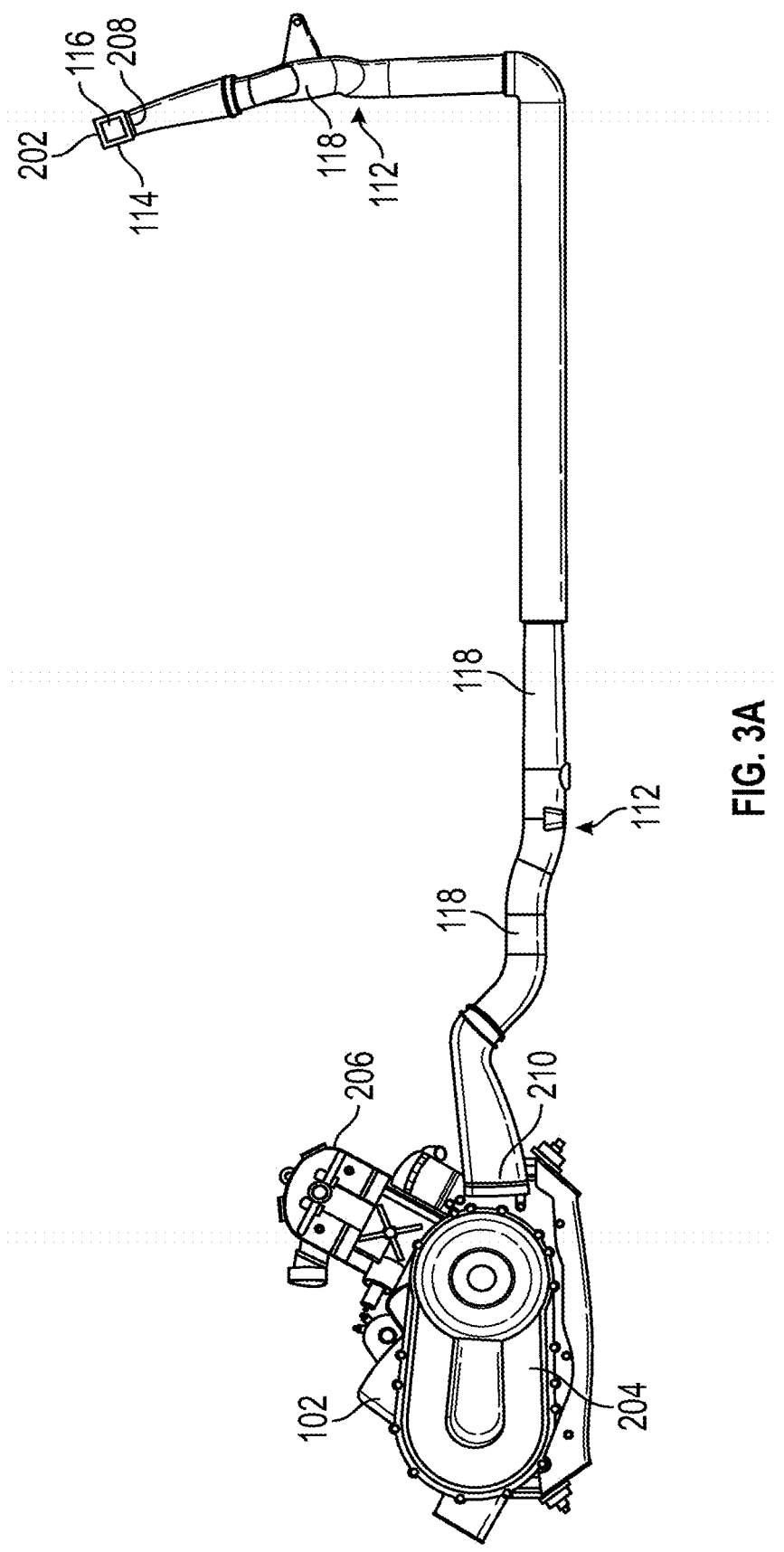
FIG. 3A is a side view of the air intake system of FIG. 2.
Figure 3B:
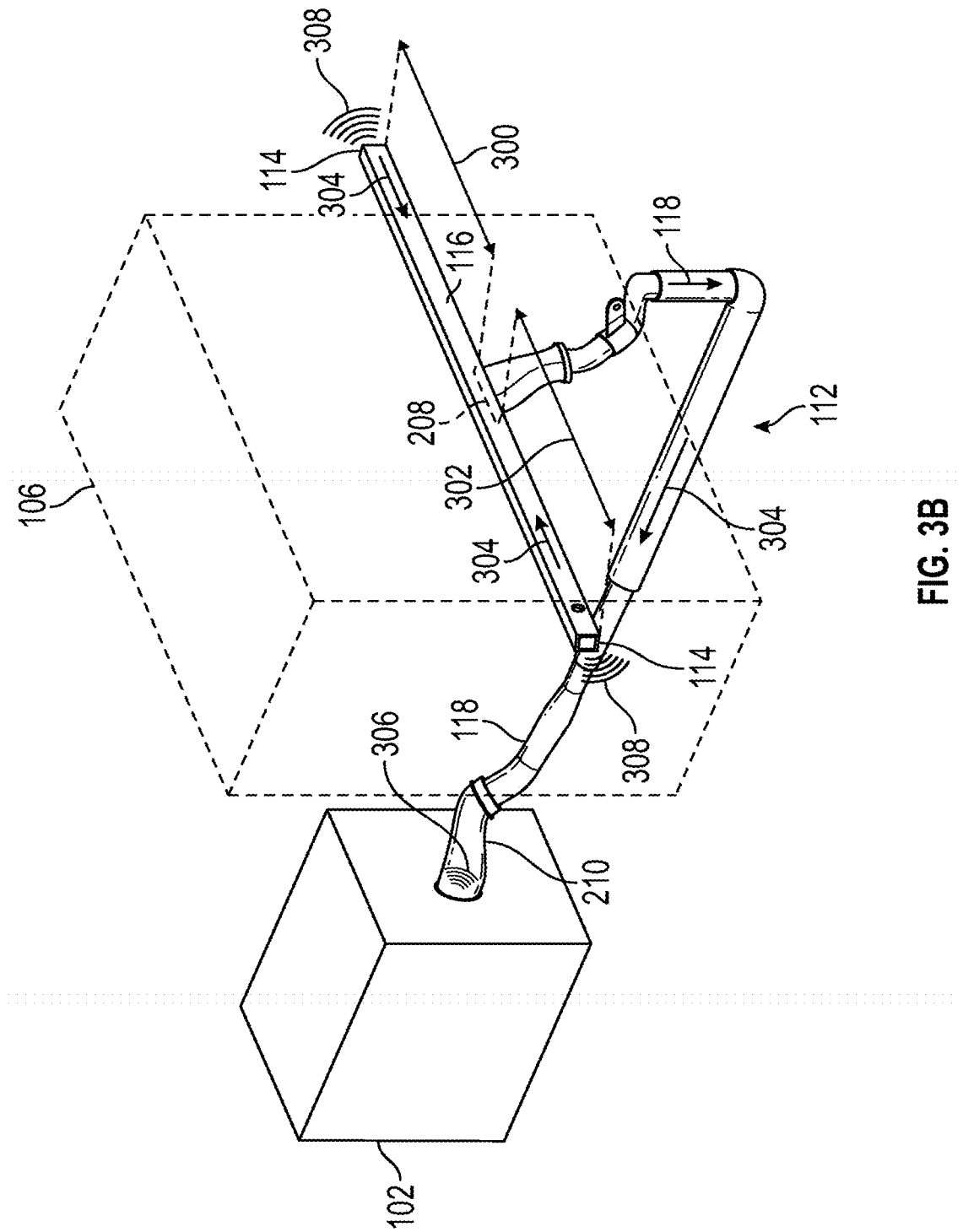
FIG. 3B is schematic view of the air intake system of FIG. 2.

FIGS. 3A and 3B show additional views of one example of the intake system 112. In the example shown in the FIG. 3A, 3B, other components of the vehicle 100 including frame components 202 (as shown in FIG. 2) and the like are removed to provide an unobstructed view of the intake system 112. Referring first to FIG. 3A, the intake system 112 is shown coupled with one or more engine components 102. In the example shown, the engine components 102 include one or more of a continuous variable transmission (CVT) 204, an engine 206 or the like. The intake duct 118 of the intake system 112 is coupled with the engine components 102, for instance, the CVT 204 by way of an engine component intake port 210. The intake duct 118 extends from the engine components 102 and, as shown in FIG. 3A, is coupled with the engine air passage 116 at a duct port 208. In the view shown in FIG. 3A, the engine air passage 116 optionally extends into or out of the page. As shown, at least one intake port 114 is provided near an end of the engine air passage 116 (e.g., at the end or proximate the end). As previously described herein in other examples, the one or more intake ports 114 are provided at intermediate positions along the engine air passage 116, for instance, at orifices provided along the engine air passage 116 including, but not limited to, a frame component 202. As shown in FIG. 3A, the engine air passage 116 in this example is provided as part of the frame component 202 extending into and out of the page. In another example, the engine air passage 116 is included with or provided by one or more of a dedicated tube, passage, duct or the like, for instance, coupled with another portion of the vehicle such as the vehicle frame 200.

FIG. 3B shows a schematic view of the intake system 112. In this example, the intake system 112 is schematically shown in a similar orientation to that shown in FIG. 3A. A schematic version of the vehicle cabin 106 is between the engine components 102 and the intake ports 114. As shown in FIG. 3B, the intake ports 114 are provided in front of the vehicle cabin 106 relative to the engine components 102. In another example, the intake ports 114 are provided on either side of the vehicle cabin 106. For instance, the intake ports 114 are directed laterally relative to the vehicle cabin 106 and accordingly noise generated by engine components 102 (and delivered through the intake system 112) is directed in an outward fashion away from the vehicle cabin 106.

Referring again to FIG. 3B, the engine air passage 116, in this example, one or more of a tube, duct, frame component 202 or the like extends to the left and the right of the duct port 208. For instance, each of the intake ports 114 are spaced an amount corresponding to bracketed lines shown in FIG. 3B. In one example, the intake port 114 on a first side (e.g., a first vehicle side 108 in FIG. 2) of the vehicle 100 is spaced by a first spacing 300 from the duct port 208. And the second intake port 114 (e.g., on a second vehicle side 110) is spaced from the duct port 208 by a second spacing 302. In one example, the first and second spacings 300, 302 are identical. That is to say, the intake ports 114 are positioned equidistantly from the duct port 208. In another example, the first and second spacings 300, 302 are different (e.g., the first and second spacing 300, 302 are not equal).

In one example, the intake duct 118 is coupled with the engine air passage 116 at a position shifted relative to the midpoint shown in FIG. 3B. For instance, the intake duct 118 is routed differently through the vehicle 100 according to other components of the vehicle including, but not limited to, the suspension; the vehicle frame 200; components in the vehicle front or rear portions 120, 122; components in the vehicle cabin 106; such as the dashboard; controls (steering, throttle) or the like. With the duct port 208 and the intake duct 118 laterally shifted, in one example, the first and second spacings 300, 302 are thereby correspondingly changed to position one of the intake ports 114 closer relative to the duct port 208 than the other intake port 114. Each of the intake ports 114 whether equidistantly or differently spaced from the duct port 208 provide air flow to the intake duct 118 and accordingly to the one or more engine components 102. As previously described, in one example the intake ports 114 are positioned near the first and second vehicle sides 108, 110. In another example, the intake ports 114 are positioned at different locations on the vehicle 100. For instance, one of the intake ports 114 is, in one example, provided on either the first or second vehicle sides 108, 110 and the other vehicle port is provided at a different location, for instance, on the hood; the vehicle top portion; vehicle bottom portion; vehicle front or rear portions 120, 122; within a portion of the frame or the like (each of these locations corresponding to a different location, side or portion of the vehicle as used herein). In another example, the intake ports 114 at differing locations are provided at proximate (spaced apart and thereby different) locations at one or more portions of the vehicle front portion 120, rear portion 122, sides 108, 110 or the like.

Referring again to FIG. 3B, the intake system 112 is shown schematically in an operative configuration. For instance, air is received through the intake system 112 according to the intake direction 304 arrows shown in FIG.

3B. As shown, air received at the one or more intake ports 114 is delivered to the duct port 208. The intake duct 118 delivers the air along the intake direction 304 toward the engine components 102. In one example, the intake ports 114 include a composite cross-sectional area at least equal to the cross-sectional area of the duct port 208 and the intake duct 118. In another example, the cross-sectional area of the intake ports 114 when taken together is greater than the corresponding cross-sectional area of the intake duct 118 or the duct port 208. Where one of the intake ports 114 is fouled (partially or fully), for instance, by water, mud, particulate matter or the like (e.g., while the vehicle 100 is traversing uneven terrain, within water or the like) the remaining unobstructed intake port 114 (for instance at a different location on the vehicle 100) is configured to provide an adequate amount of air flow through the respective intake port 114 for the engine components 102 through the intake duct 118. That is to say, the intake ports 114 as well as the corresponding portions of the engine air passage 116 are sized and shaped to provide sufficient air to the engine components 102 while another of the intake port 114 or another portion of the engine air passage 116 is otherwise fouled (e.g., obstructed, blocked partially or fully) or the like. In an example, the cross sectional area of each intake port 114 and the engine air passage 116 (from the port to the intake duct 118) is at least equal to the cross sectional area of the intake duct 118. In another example, the composite cross sectional area of the respective intake ports 114 and the associated engine air passage (for each port 114) is at least double that of the intake duct 118.

As further schematically shown in FIG. 3B, engine noise 306 is diverted through the intake system 112 away from the remainder of the vehicle 100 including, for instance, the vehicle cabin 106 shown in FIGS. 3B and 1. In the example shown in FIG. 3B, engine noise 306 is generated by one or more of the engine components 102 and delivered into the intake system 112 in a direction opposed to the intake direction 304 for the air. Engine noise 306 is delivered through the intake system 112, for instance, in a torturous pathway shown by the intake duct 118 whether provided in FIG. 3 or shown in other figures herein. The torturous passage of the engine noise 306 attenuates the engine noise 306 prior to exit from the intake system 112.

The (attenuated) engine noise 306 is delivered from the intake system 112 and away from the vehicle 100, for instance, from the intake ports 114. As shown in FIG. 3B, diverted noise 308 is provided from each of the intake ports 114. As shown in FIG. 3B, the diverted noise 308 is directed away from the vehicle cabin 106. In one example, the intake ports 114 are positioned outside of the vehicle cabin 106 and directed away from the vehicle cabin 106. As shown in FIG. 3B, the intake ports 114, in one example, are provided forward relative to the vehicle cabin 106 and open away from the vehicle cabin 106. The diverted noise 308 (attenuated by passage through the intake system 112) is delivered away from the rider and driver within the vehicle cabin 106 to accordingly provide a minimized noise profile for the vehicle 100.

Figure 4:
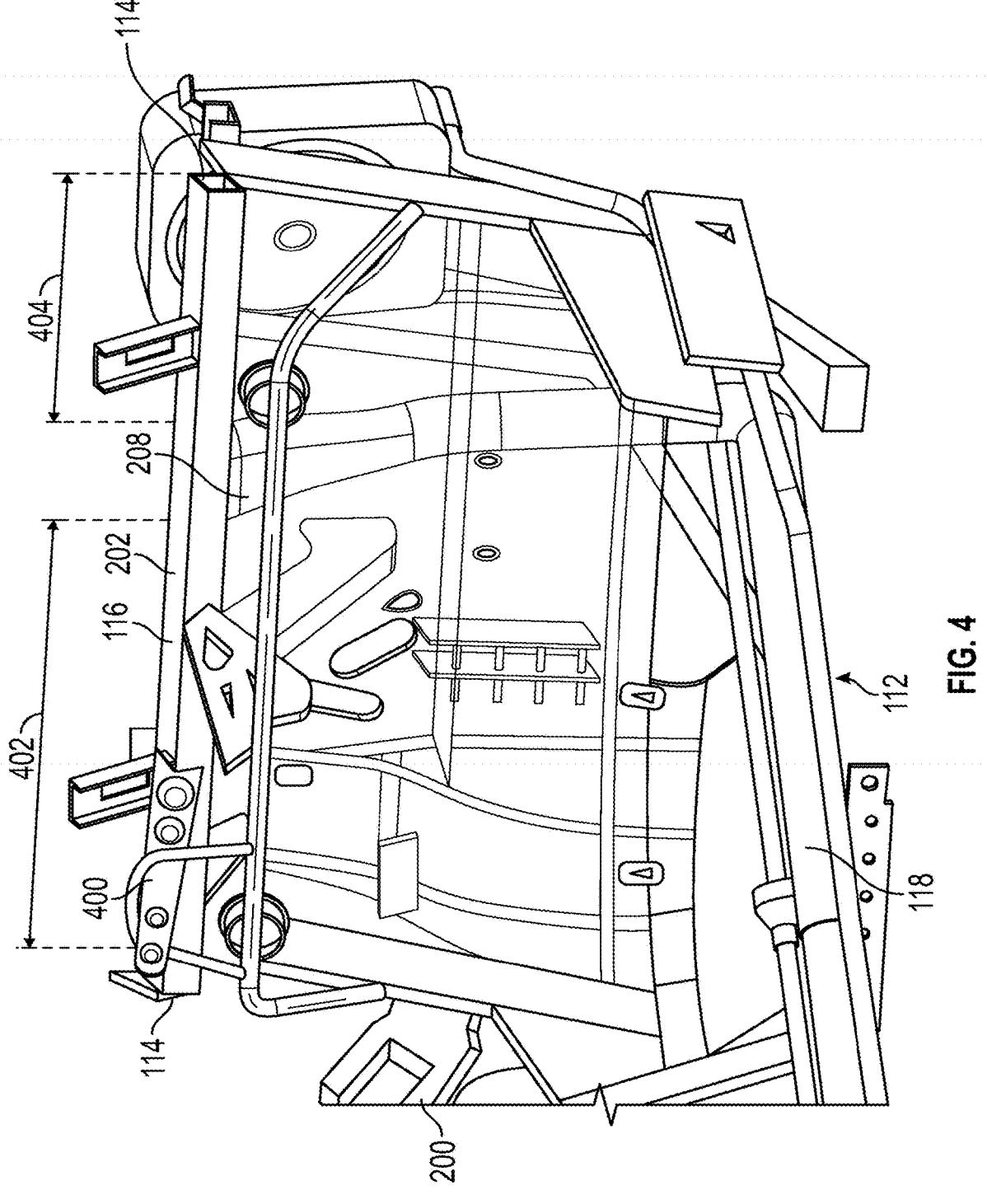
FIG. 4 is a perspective view of a portion of a vehicle and one example of a frame component including an engine air passage and one or more intake ports.
Figure 5:
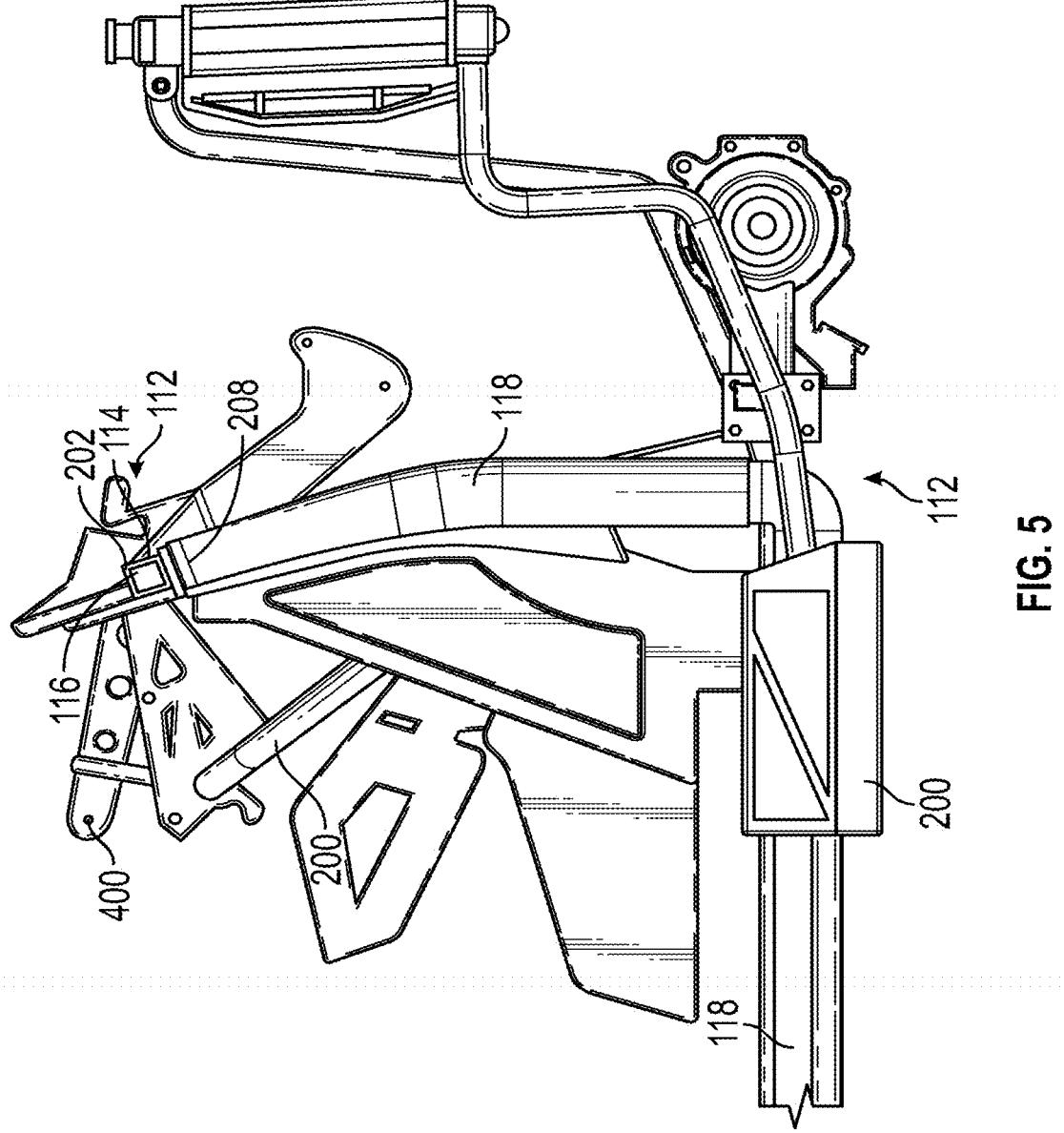
FIG. 5 is a side view of the port of the vehicle and the frame component of FIG. 4.

FIGS. 4 and 5 show additional examples of the intake system 112. The intake duct 118 is routed through the vehicle 100, for instance, through the vehicle frame 200 to the engine air passage 116. Referring first to FIG. 4, the intake duct 118 extends upwardly from an elbow near a bottom portion of the vehicle 100 and is coupled at a duct port 208 with the engine air passage 116. In the example shown in FIG. 4, the engine air passage 116 includes a frame component 202 extending laterally relative to the intake duct 118. In another example, the engine air passage 116 is provided by a tube, duct or the like extending through the vehicle 100, for instance, laterally. As previously described, the engine air passage 116 extends from the intake duct 118 to one or more intake ports 114. In the example shown in FIG. 4, the intake ports 114 are provided on opposed sides of the engine air passage 116 relative to the duct port 208.

One example of the intake port 114 is shown in the side view of FIG. 5 extending out of the page. The intake port 114 has, in one example, a cross-sectional area at least equal to the cross-sectional area of the intake duct 118. In another example, the intake port 114 includes first and second intake ports 114 (or additional intake ports) having a composite cross-sectional area greater than the cross-sectional area of the intake duct 118. As previously described herein, if one of the intake ports 114 is fouled (partially or fully), the remaining intake port or ports 114, for instance on another side of the vehicle 100, are configured to provide sufficient air flow to the one or more engine components 102 through the engine air passage 116 and the intake duct 118 to offset the decreased flow from the fouled intake port (or ports) 114. That is to say, the engine air passage 116, the intake duct 118 and the corresponding open intake port (o ports) 114 are each of sufficient cross-sectional area to provide adequate air flow to the one or more engine components 102 coupled with the intake system 112.

Referring again to FIG. 4, the duct port 208 and a portion of the intake duct 118 (extending vertically in the figure) are provided at a lateral position relative to the midpoint of the engine air passage 116. In this example, the first and second spacings 402, 404 for each of the intake ports 114 from the intake duct 118 varies. For instance, as shown, the vehicle frame 200 includes one or more components such as a steering column support bracket 400 that are positioned near to or at the midpoint of the vehicle frame 200. Accordingly, the duct port 208 and the corresponding portion of the intake duct 118 are laterally positioned relative to the steering column support bracket 400. The first and second spacings 402, 404 are varied to account for the position of the duct port 208. As shown, the first spacing 402 for the intake port 114 (on the left side) is greater than the second spacing 404 of the intake port 114 (on the right side of the vehicle 100). In another example, the engine air passage 116 includes a nonlinear shape configured to extend around one or more other features of the vehicle 100 including, but not limited to, other frame components, wiring harnesses, dashboard components, engine components or the like provided near to the intake system 112. For instance, in one example, one or more of the engine air passage 116 or the intake duct 118 includes a nonlinear configuration to navigate around one or more other components of the vehicle 100. The engine air passage 116, the intake duct 118 and the intake ports 114 remain configured, even in the nonlinear arrangement, to provide intake air to the one or more engine components 102. As described herein the non-linear (e.g., tortuous) passages of the intake system 112 attenuate noise otherwise delivered through the intake system.

Figure 6:
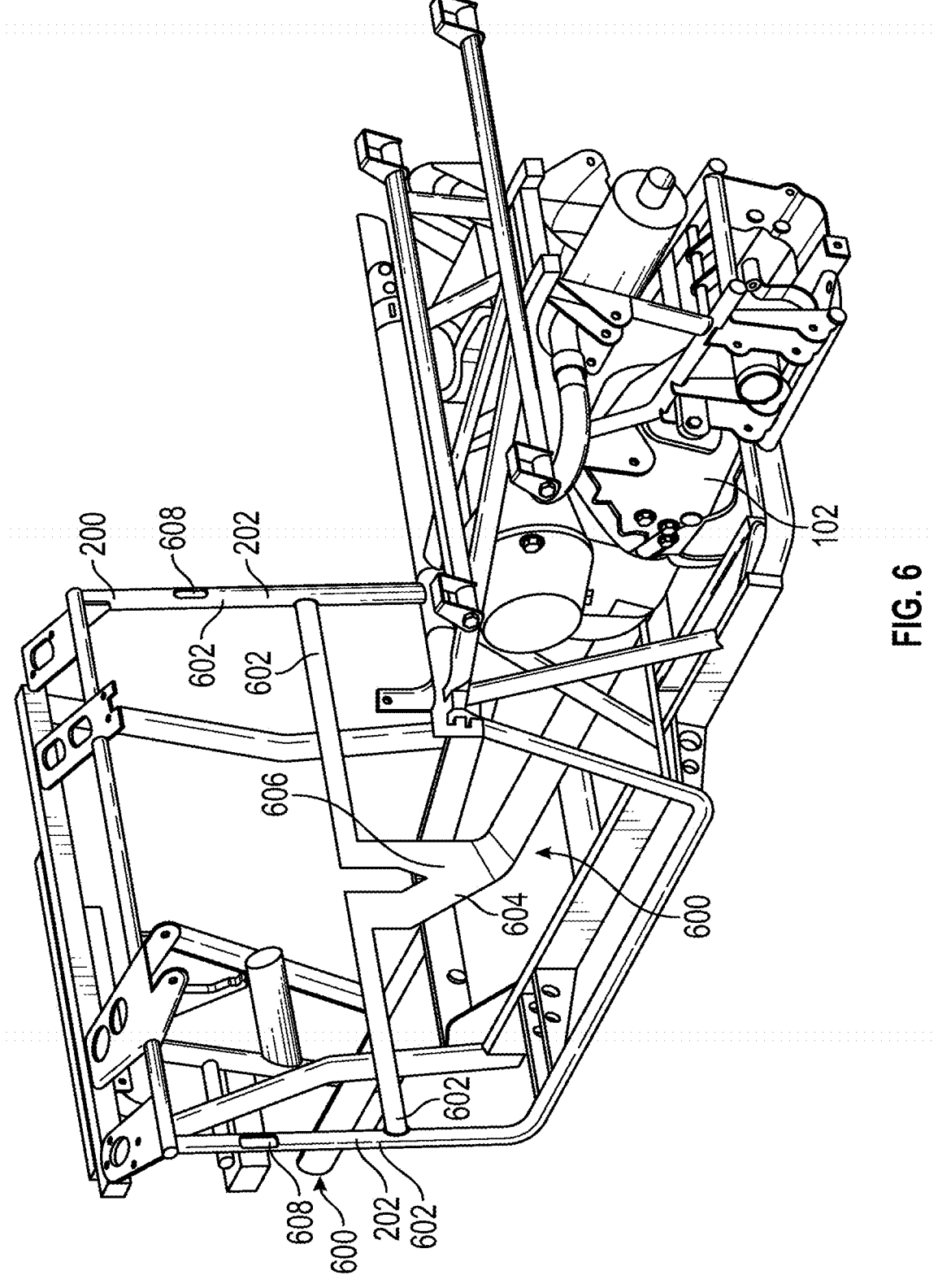
FIG. 6 is a schematic view of another example of an air intake system including a plurality of frame components including engine air passages and one or more intake ports.

FIG. 6 shows another view of a portion of a vehicle, such as the vehicle 100. In the example shown in FIG. 6, the vehicle frame 200 is provided again along with one or more engine components 102 and another example of an intake system 600. In the example shown, the intake system 600 includes an intake duct 604 extending from the one or more engine components 102 to another portion of the vehicle, for instance, a front portion of the vehicle including an engine air passage 602.

In contrast to the previously described intake system 112, the example intake system 600 provided in FIG. 6 uses differing frame components 202, tubes, ducts or the like to provide the engine air passage 602 and the one or more intake ports 608. For instance, as shown, the intake system 600 includes a plurality of frame components 202 extending laterally and vertically relative to the intake duct 604 (e.g., from the duct port 606). As shown, from the duct port 606 the engine air passage 602 is bifurcated and extends to the left and the right of the intake duct 604. The engine air passage 602 continues into other frame components 202, for instance, the substantially vertical component shown in FIG. 6. The frame components 202 include the intake ports 608 as shown in FIG. 6. As with other examples described herein, the intake system 600 optionally includes one or more intake ports 608. In another example, the intake system 600 includes a plurality of intake ports including two or more intake ports provided on one or more frame components 202 including the components shown in FIG. 6 or other frame components.

The example shown in FIG. 6 illustrates the concept that the intake ports 608 are positionable at one or more locations on the vehicle 100 and are not simply limited to the configurations or placements previously shown. Instead, the one or more intake ports 608 are readily positioned around the vehicle, for instance, in one or more positions outside of the vehicle cabin to ensure the delivery of a clean flow of intake air to the one or more engine components 102 while at the same time attenuating noise otherwise incident within the vehicle cabin 106 shown in FIG. 1. In the view shown in FIG. 6, the intake ports 608 are provided at a forward position relative to the vehicle cabin (positioned between the one or more engine components 102 and the intake ports 608). In another example, the intake ports 608 are directed outwardly from the vehicle 100, for instance, to the left and the right relative to the vehicle 100. Accordingly, noise generated by the engine components 102 and delivered through the intake system 600 is delivered (e.g., diverted outwardly) away from the vehicle 600 and minimized for hearing by the driver, rider or the like.

Figure 7:
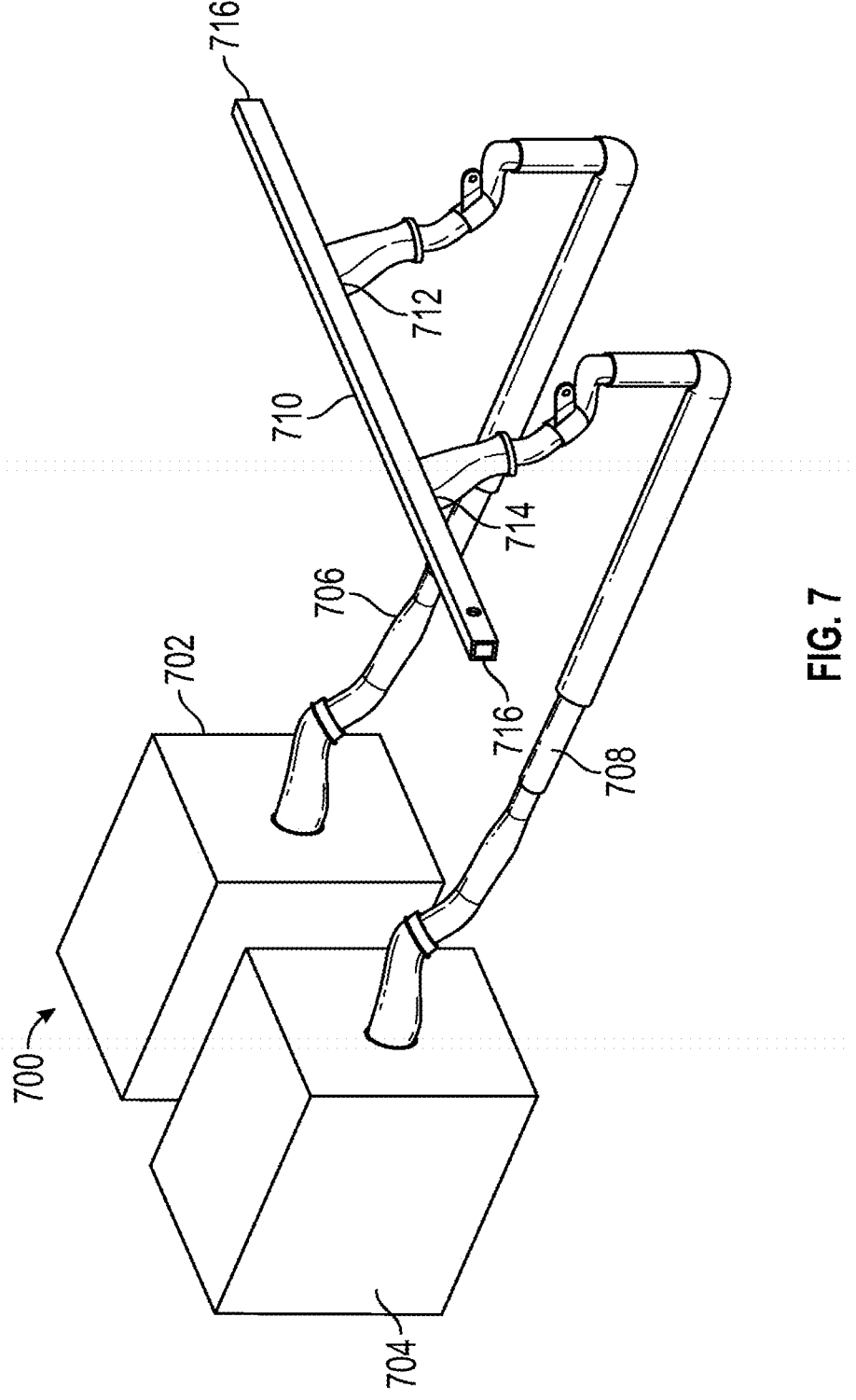
FIG. 7 is a schematic view of another example of an air intake system.

FIG. 7 shows another example of an intake system 700 coupled with first and second engine components 702, 704. Although FIG. 7 shows the intake system 700 used with first and second engine components 702, 704, in another example the intake system 700 (as well as any of the other example intake systems described herein) are used with two or more engine components. The intake system 700 includes first and second intake ducts 706, 708 separately extending away from the first and second engine components 702, 704 toward an engine air passage 710 including one or more intake ports, such as the intake port (or ports) 716. As shown in FIG. 7, separate first and second intake ducts 706, 708 are provided. In another example, the first and second engine components 702, 704 include a unitary intake duct, for instance, similar to the intake duct 118 previously shown herein that provides air to each of the first and second engine components 702, 704. The example composite intake duct is similarly in communication with the engine air passage 710.

Returning to the example shown in FIG. 7 including first and second intake ducts 706, 708, the ducts 706, 708 communicate with the engine air passage 710 by respective first and second duct ports 712, 714. As further shown in FIG. 7, the intake system 700, in this example, includes first and second intake ports 716 provided at differing locations along the engine air passage 710. As shown in the example, the intake ports 716 are provided at opposed ends of the engine air passage 710. As previously described herein, the one or more intake ports 716 as well as the respective intake ducts 706, 708 and the engine air passage 710 are configured to provide sufficient air flow to each of the first and second engine components 702, 704 to facilitate the full range of operation of each of the engine components. That is to say, each of the intake ports 716, in one example, has a cross-sectional area large enough to provide a dedicated flow of air (if another port 716 is partially or fully fouled) to each of the first and second engine components 702, 704, for instance, by way of the respective intake ducts 706, 708. That is to say, in one example, where a first intake port 716, for instance, in a first portion of the vehicle is clogged, obstructed or the like, the other intake port 716 in another section portion of the vehicle is configured to provide sufficient air flow to each of the engine components to facilitate their full operational range.

As shown in FIG. 7, the engine air passage 710 is optionally a composite engine air passage that provides a flow of air to each of the first and second engine components 702, 704 through the first and second intake ducts 706, 708 (or, in another example described herein, through a composite intake duct). In another example, the engine air passage 710 is split, for instance, into dual engine air passages that each communicate with one of the first and second engine components 702, 704. For instance, the intake system 700 is, in one example, bifurcated to provide a separate intake system portion for the first engine component 702 and a second intake system portion for the second engine component 704. In one example, each of the intake system portions includes one or more intake ports 716. In another related example, the bifurcated portions of the intake system 700 each include a plurality of intake ports 716 for each portion of the system 700. In one example, the bifurcation of the intake system 700 as described herein isolates each of the air flows for the first and second engine components 702, 704 to substantially prevent the cross-communication of air flow to each of the components.

As previously described herein, the example intake systems, for instance, the intake systems 112, 600, 700 include intake ducts in communication with an engine air passage 710. Although these features are described separately in one example, each of the ducts and engine air passages are, in one example, conceptually the same passage, for instance, a continuous or non-continuous tube extending from the one or more engine components to the respective intake ports as described herein. The engine air passage and the intake ducts are, in one example, a composite of a plurality of tubes, frame components or the like as described herein. In another example, the engine air passages, intake ducts and the like are provided by way of a unitary tube, frame component or the like extending from the first and second engine components to the respective intake ports. Stated another way, the various elbows, interconnects, duct ports or the like previously described herein are interpreted as components of the ducts, engine air passages or the like and are not necessarily considered separate components or parts (of the ducts or engine air passages). Instead the intake systems are considered as passages extending from the one or more engine components to the respective intake ports.

Figure 8A:
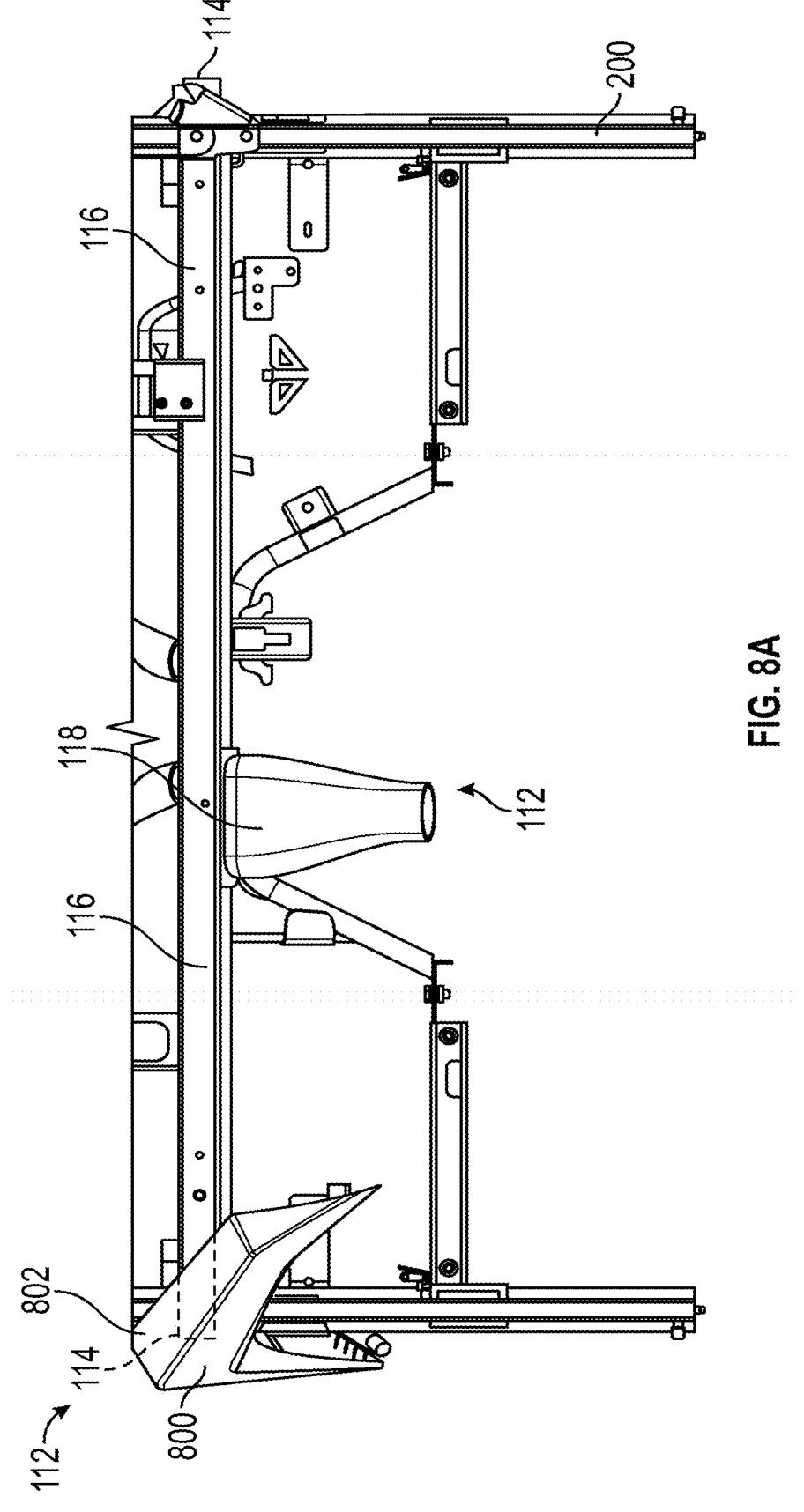
FIG. 8A is a detailed front view of a portion of the vehicle frame with one example of a fouling shield extending over an intake port.
Figure 8B:
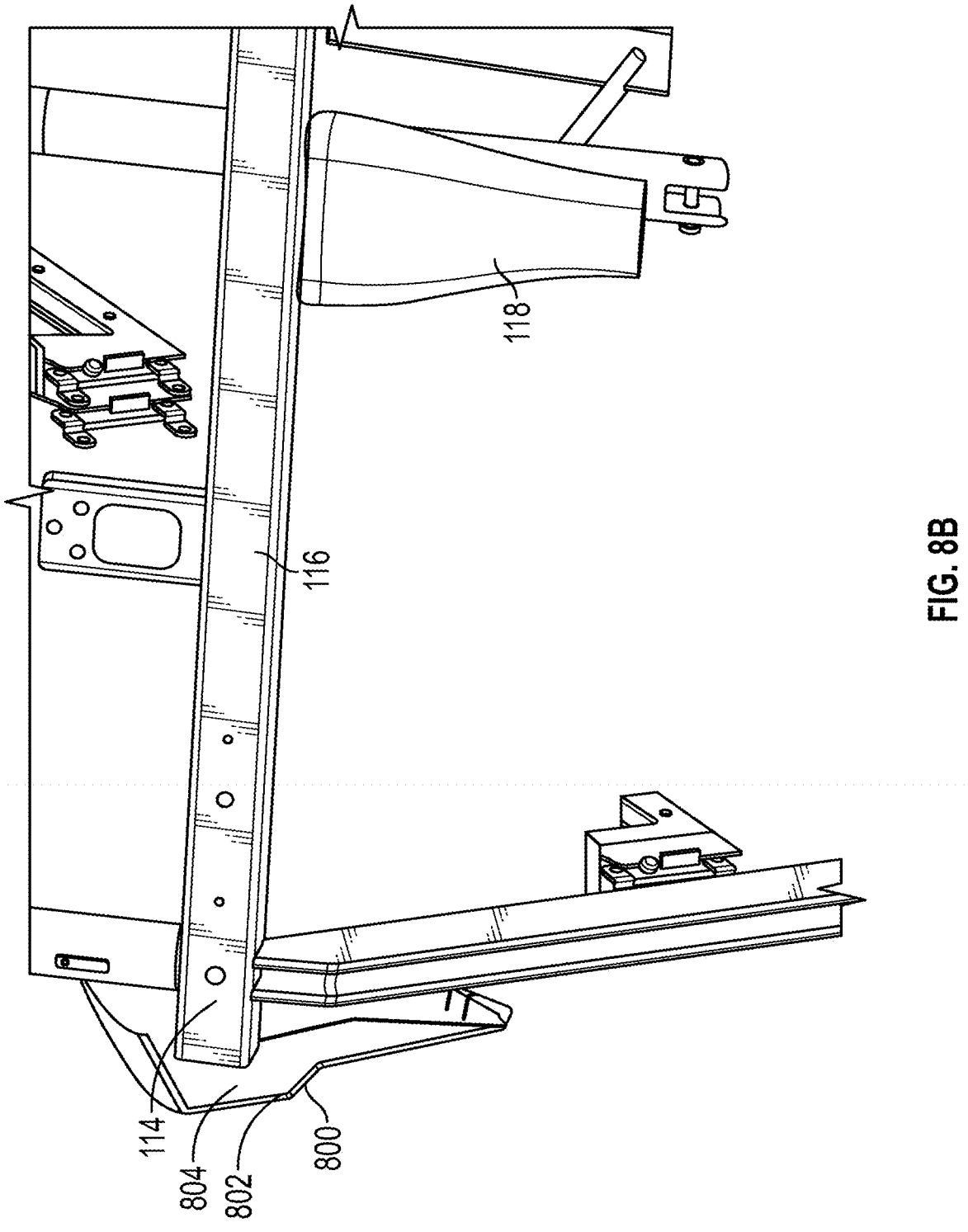
FIG. 8B is a partial sectional view of the fouling shield and intake port of FIG. 8A.

In some examples, the passages include, but are not limited to, one or more of the frame components such as the frame components 202 previously described and shown herein. In other examples, the various passages of the intake systems include, but are not limited to, tubes, ducts or the like extending through the vehicle that incorporate in part portions of the frame such as the frame components 202 or are provided entirely without frame components, for instance, as separate tubes extending through the vehicle and routed around the frame components and other components of the vehicle 100. FIGS. 8A and 8B show differing views of the intake system 112 including additional optional components. As shown in FIG. 8A, in one example, a fouling shield 800 is provided near to or over at least one of the intake ports 114. The opposed fouling shield 800 for the other intake port 114 is removed in FIG. 8A to expose the other intake port 114.

In one example, the fouling shields 800 are provided as a portion of the body, for instance, coupled to one or more of the frame components 202 of the vehicle frame 200. In another example, the fouling shields 800 are separate components from the body of the vehicle 100 and are coupled with the frame components 202 as described herein. The fouling shields 800 extend over at least a portion of the intake ports 114 to accordingly cover the intake ports 114 and substantially prevent the ingress of particulate, mud, water or the like into the intake port 114. For example, where the vehicle 100 is operated in a wilderness environment, (e.g., within or around water, mud, dirt, snow or the like) the fouling shields 800 cover each of the intake ports 114 and while allowing the inflow of air, for instance, around the fouling shields 800, the fouling shields substantially prevent the passage of snow, dirt, mud, water or the like (e.g., particulate) into the intake ports 114, Accordingly, while the vehicle is operated and particulate matter is disturbed and forced toward the intake ports 114, by the rotation of the ground engaging members 104 (FIG. 1) the intake ports 114 readily provide a flow of air to the one or more engine component 102 while the fouling shields prevent the ingress of particulate into the ports, engine air passage and intake duct.

Referring now to FIG. 8B, a cutaway of the fouling shield 800 shown in FIG. 8A is provided. As shown, the fouling shield 800 includes an air flow recess 804 formed by an intake port shelter 802. As shown, the fouling shield 800 forms the intake port shelter 802 as a convex portion of the shield 800 spaced from the intake port 114. The corresponding air flow recess 804 is provided between the fouling shield 800 and the intake port 114 to facilitate the ready delivery of air into the intake port 114 for delivery through the intake system 112 to the one or more engine components 102. In one example, the intake port shelter 802 and the corresponding air flow recess 804 are formed to ensure a flow rate of air into the intake port 114 to adequately supply one or more engine components coupled with the intake system 112. For instance, where one or more of the intake ports 114 are closed or fouled (e.g., with water, mud, dirt, snow or the like) the opposed intake port 114 even with the fouling shield 800 in place is configured by way of the air flow recess 804 to provide a sufficient flow of air to that open intake port 114 for use by the one or more engine components 102.

The fouling shield 800 shown in FIGS. 8A and 8B further provides for noise attenuation of the engine components 102 coupled with the intake system 112. As previously described herein, the tortuous passage for noise generated by the engine components 102 extends through each of the components of the intake system 112 including the intake duct 118, the engine air passage 116 and the intake ports 114. The intake ports 114 direct noise away from the vehicle 100, for instance, away from the vehicle cabin 106 shown in FIG. 1. In other examples, the intake ports 114 are positioned outside of the vehicle cabin 106, for instance, forwardly as previously described herein. Additionally, in another example, the intake ports 114 are directed laterally away from the vehicle cabin 106 and accordingly direct noise in an outward fashion from the vehicle 100 to minimize noise incident on both of the driver and passenger of the vehicle 100. In the example shown in FIGS. 8A, 8B, the fouling shields 800 provided for the intake ports 114 further muffle noise delivered from the intake ports 114 to the exterior of the vehicle 100. That is to say, the fouling shields 800 intercept noise generated from the intake ports 114 (e.g., diverted noise 308 as shown in FIG. 3B) and substantially muffle the noise prior to delivery of the noise from the vehicle 100, for instance, to one or more of the driver, passenger or observers of the vehicle 100. The fouling shields 800 thereby facilitate and maintain the flow of air to the engine components 102 while at the same time muffling and attenuating noise generated by the engine components 102 and otherwise delivered from the intake ports 114.

Figure 9:
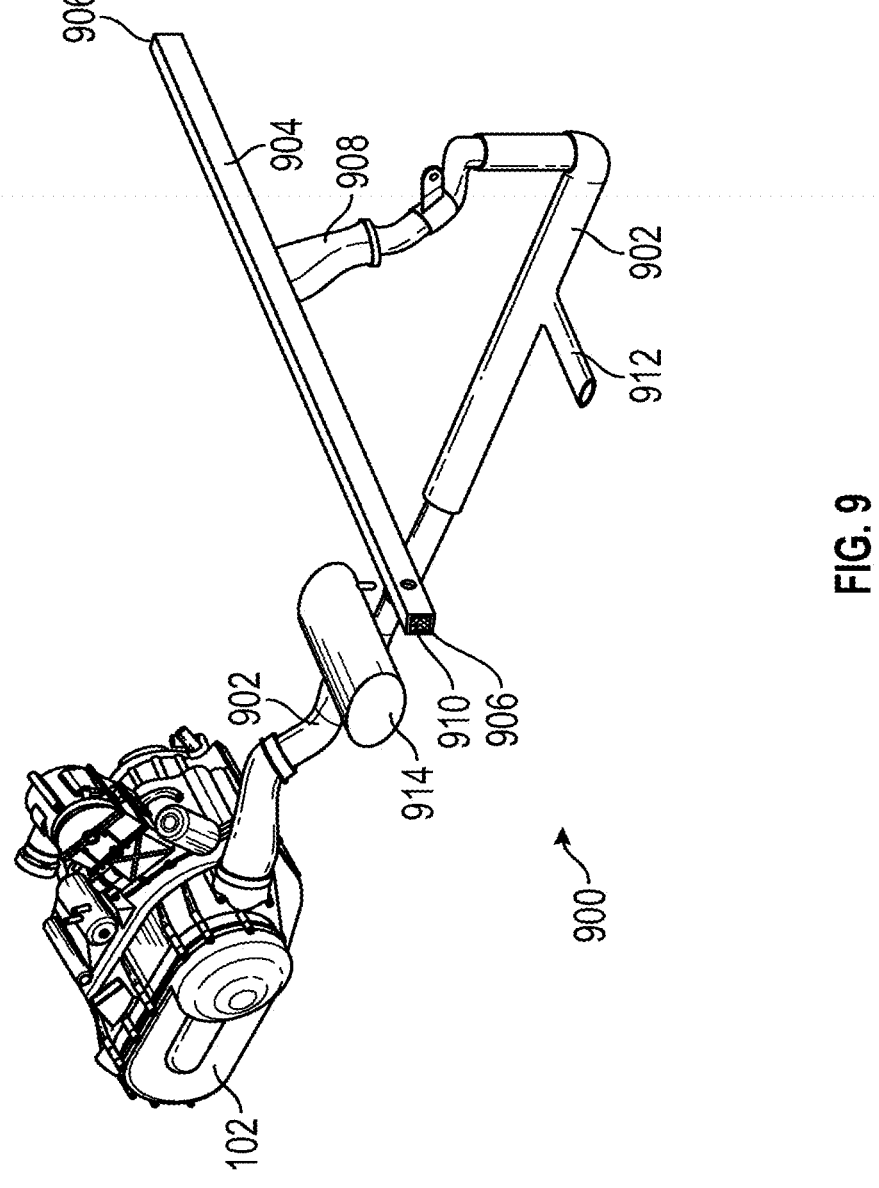
FIG. 9 is a perspective of an additional example of an air intake system.

FIG. 9 shows another example of an intake system 900. The intake system 900 includes at least some similar components to the previously described intake systems provided herein. For instance, the intake system 900 includes an engine air passage 904 having one or more intake ports 906. In one example, the engine air passage 904 includes a frame component of the overall frame of the vehicle such as the vehicle 100 (shown in FIG. 1). The engine air passage 904 is in communication with the intake duct 902. As shown in FIG. 9, a duct port 908 provides the interconnection between the intake duct 902 and the engine air passage 904. As described herein, in another example the duct port 908 is an integral portion of one or more of the intake duct 902, the engine air passage 904 or the like. The intake duct 902 extends toward at least one engine component 102 and thereby provides a flow of intake to the at least one engine component 102 (e.g., including, but not limited to, an engine, transmission, such as a continuous variable transmission or the like).

Referring again to FIG. 9, in one example, the intake ports 906 include port screens 910 provided over the intake ports 906 (including within the engine air passage 904) to screen air received through the intake ports 906 and eventually delivered to the one or more engine components 102. In one example, the port screens 910 have sufficient porosity to readily facilitate the communication of air through the intake ports 906 without otherwise throttling or choking the flow of air to the one or more engine components 102 coupled with the intake system 900. In another example, the port screen 910 includes pores sized to capture one or more of particulate matter including, but not limited to, mud, water, soil, snow or the like otherwise incident at the intake ports 906. In another example, the port screens 910 include two or more stages. For instance, multiple port screens 910 are provided at or near the intake ports 906. Each of the port screens 901 have differing porosities to provide two-stage or multi-stage screening of particulate prior to communication through the engine air passage 904 to the other components of the intake system 900 and the one or more engine components 102.

As further shown in FIG. 9, the intake system 900, in another example, optionally includes an intake attenuator 912. In one example, the intake attenuator 912 is configured to further attenuate the noise otherwise generated by the one or more components 102 and delivered through the intake duct 902 and out of the intake ports 906. The intake attenuator 912 includes, but is not limited to, one or more of a quarter wave resonator, a Helmholtz resonator or the like. The intake attenuator 912, in one example, is configured to deliver engine component noise out of phase relative to noise delivered from the intake ports 906. The out of phase noise from the intake attenuator 912 interferes with the noise delivered through the intake ports 906 and accordingly provides additional muffling of the noise otherwise generated by the one or more components 102. The intake attenuator 912 is optionally included and used in combination with one or more attenuating components, for instance, the tortuous passages of the intake duct 902, engine air passage 904 and the like to accordingly minimize the noise profile of a vehicle, such as the vehicle 100.

Figure 10A:
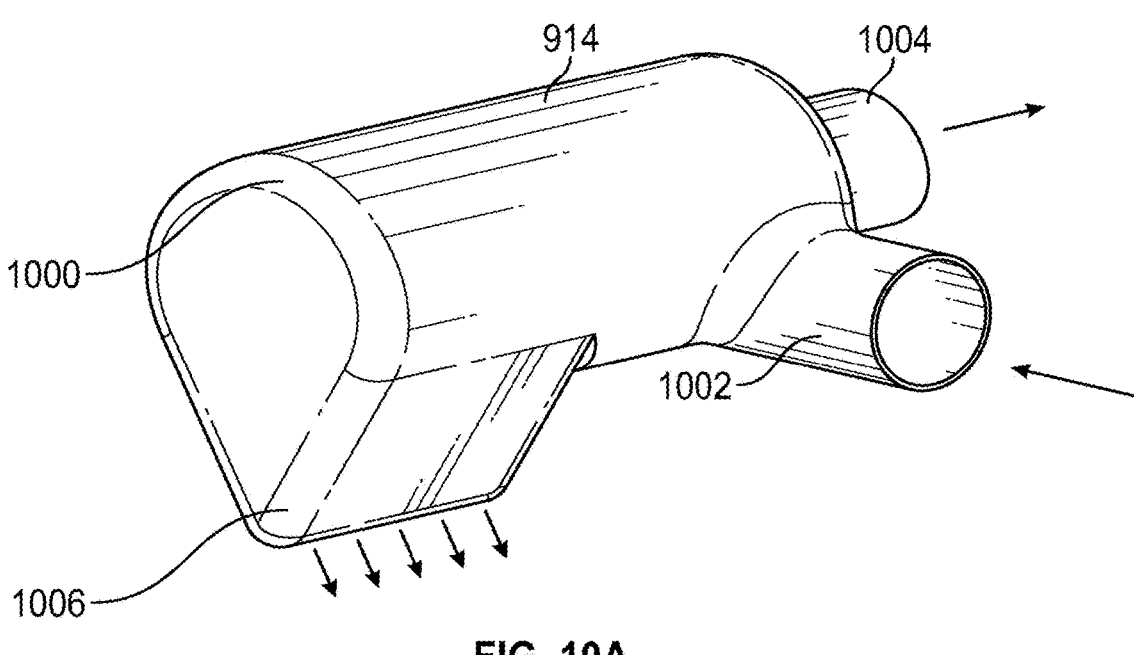
FIG. 10A is a perspective view of one example of an intake filter.
Figure 10B:
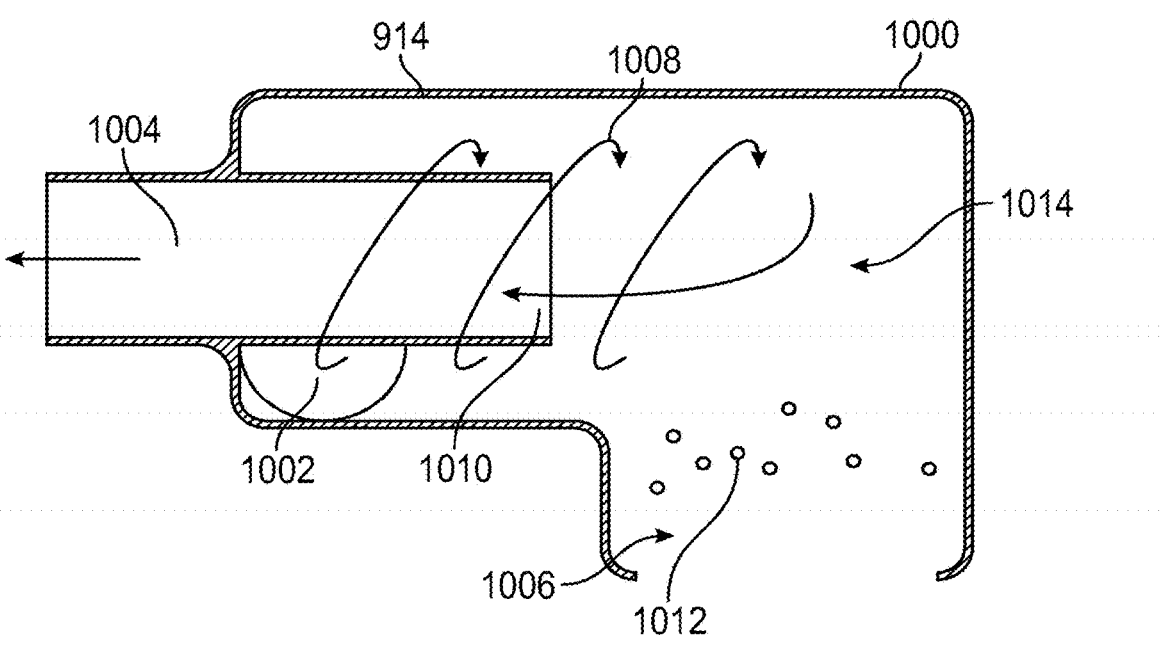
FIG. 10B is a cross sectional view of the intake filter of FIG. 10A.

As further shown in FIG. 9, an intake filter 914 is optionally provided with the intake system 900. The intake filter 914 is optionally provided in line with the intake duct 902. For instance, intake air provided through the intake duct 902 (by way of the intake ports 906 and the engine air passage 904) is delivered through the intake filter 914 on its way through the intake duct 902 to the one or more engine components 102. The intake filter 914 includes one or more of a plurality of differing filter types including, but not limited to, filters having filter media and filters without filter media such as vortex, cyclonic, centrifugal separating filters or the like. One example of an intake filter, such as a cyclonic intake filter, is shown in FIGS. 10A, B. Referring again to FIG. 9, the intake filter 914 intercepts particulate not otherwise intercepted by other features of the intake system 900 including, for instance the port screens 910, and accordingly prevents (e.g., entirely prevents, minimizes or the like) the ingress of particulate or other pollutants into the intake air otherwise received at the one or more engine components 102. One example of an intake filter 914 is shown on FIG. 10A. As previously described herein, the intake filter 914 includes, but is not limited to, a centrifugal or cyclonic filter configured to provide a vortex therein to separate particulate from the intake air prior to delivery to the one or more engine components 102. The intake filter 914 is shown with a filter body 1000 having a filter inlet 1002 and a filter outlet 1004. The filter inlet 1002 is, in one example, provided upstream relative to the filter body 1000 and accordingly is positioned more proximate to the intake ports 906 and the engine air passage 904 than the filter outlet 1004. Conversely, the filter outlet 1004 is provided downstream from the filter body 1000 and proximate to the one or more engine components 102 (e.g., relative to the filter inlet 1002). Referring again to FIG. 10A, the intake filter 914 includes a particulate chute 1006 that provides an opening in the filter body 1000 for the gravity (and vortex) based exit of particulate from the intake filter 914 (e.g., from a separation zone 1014 as shown in FIG. 10B) prior to delivery of the intake air through the filter outlet 1004. The particulate chute 1006 is further shown in FIG. 10B and opens from the filter body 1000 as shown.

In operation, the intake filter 914 receives intake air, for instance, through the filter inlet 1002. The intake air passes into the filter body 1000 according to demand (suction) from the one or more engine components 102. As shown, the intake air assumes a vortex configuration 1008 and the vortex configuration 1008 spins or biases the particulate 1012 out of the intake air. The particulate 1012 escapes from the filter 914 by way of the particulate chute 1006 (e.g., by gravity, force from the vortex 1008 or the like). The subsequently filtered air 1010 is delivered through the filter outlet 1004 to the one or more engine components 102. As shown in FIG. 10B, the filter inlet 1002 delivers the air into the filter 914 including a separation zone 1014 in the vortex configuration 1008. The separation zone 1014 is, in one example, positioned above the particulate chute 1006. The particulate 1012 removed from the intake air by way of the vortex 1008, accordingly drops through the particulate chute 1006 and exits the filter body 1000 as shown. In another example, the intake filter 914 shown in FIG. 9 includes one or more other types of filters, for instance, filters including filter media such as a paper filter, corrugated paper filter, cotton or spun fiber filter, non-woven filter or the like. In one example, the filter media of the corresponding intake filter is periodically changed according to maintenance recommendations, performance based criteria or the like.

Figure 11:
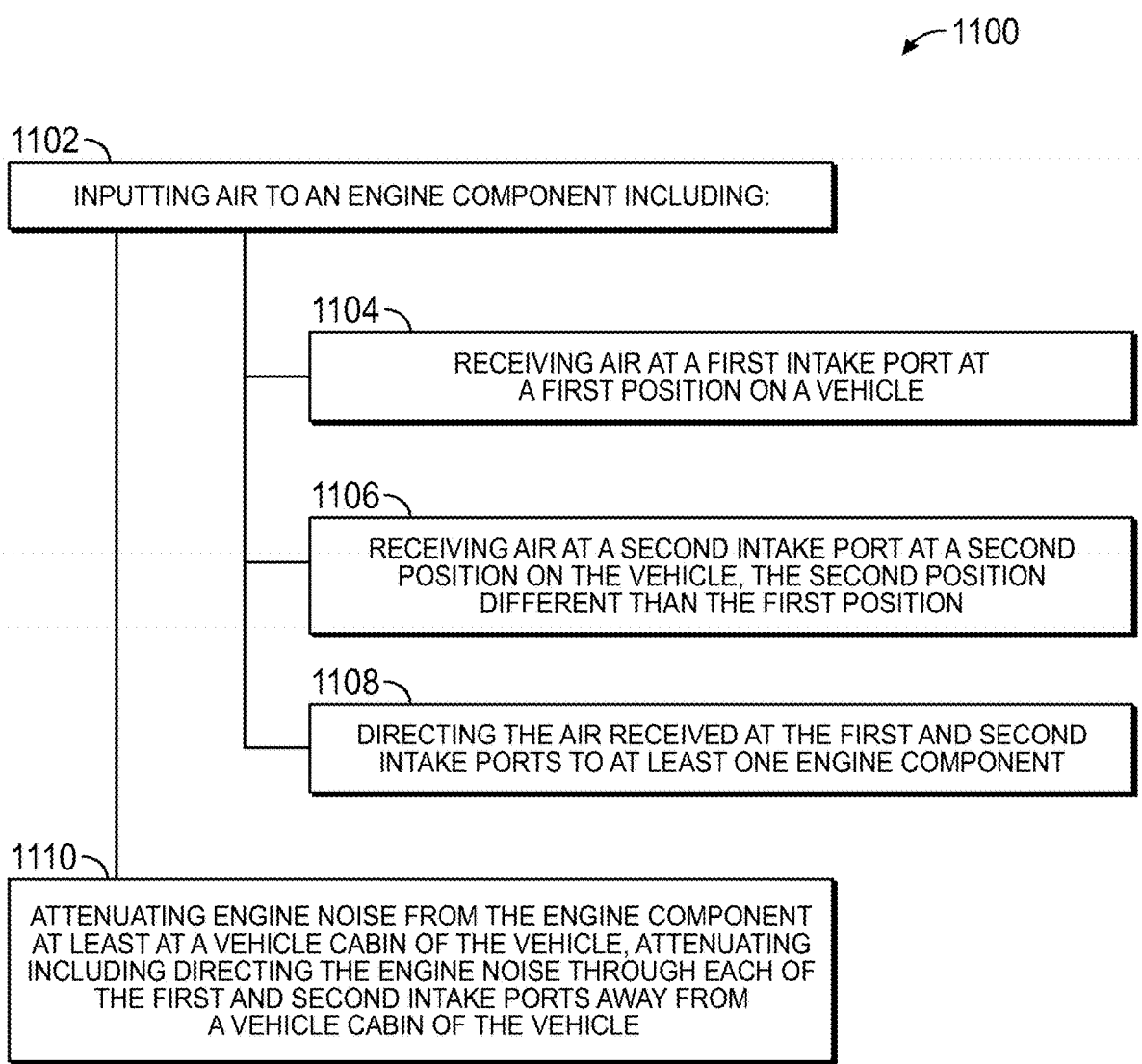
FIG. 11 is a block diagram of one example of a method for inputting air to an engine component and attenuating noise from the engine component.

FIG. 11 shows one example of a method 1100 for inputting air to an engine component, such as one or more of the engine components 102. In an example, the method 1100 optionally further includes attenuating noise from the one or more engine components. In describing the method 1100, reference is made to one or more components, features, functions, steps or the like described herein. Where convenient, reference is made to the components, features, functions, steps and the like with reference numerals. Reference numerals provided are exemplary and are not exclusive. For instance, the features, components, functions, steps and the like described in the method 1100 include, but are not limited to, the corresponding numbered elements, other corresponding features described herein (both numbered and unnumbered) as well as their equivalents.

At 1102 the method 1100 includes inputting air to at least one engine component 102 (e.g., one or more engine components 102). At 1104, in one example, inputting air includes receiving air at a first intake port, for instance, one of the intake ports 114 shown in FIG. 2. As shown in FIG. 2, one of the intake ports 114 is provided at a first position (e.g., side of the vehicle, portion of a side, portion of the vehicle or the like) of a vehicle such as the vehicle 100. At 1106, inputting further includes in another example, receiving air at a second intake port such as the intake port 114 provided at a second position, for instance, positioned on another side of the vehicle different from the first side. In another example, inputting air including, for instance, receiving air at first and second intake ports (1104, 1106) at first and second corresponding positions, is conducted at one or more differing locations on or in the vehicle 100 such as the vehicle 100 shown in FIG. 1. Each of the first and second positions is different. For instance, each of the first or second positions are spaced relative to each other, are positioned on different portions of the vehicle (e.g., front, rear, left side, right side, top, bottom, within the vehicle) or the like.

At 1108, in another example, inputting air to the one or more engine components 102 includes directing the air received at the one or more intake ports 114 (such as the first and second intake ports 114 shown in FIG. 2) to the engine component 102. As previously described herein, in one example, the one or more intake ports 114, in one example, are provided at either end of an engine air passage such as the engine air passage 116 shown in FIG. 2 and further shown in FIGS. 3A, B. The engine air passage 116, in one example, is a dedicated duct, tube or the like configured to receive intake air, for instance through the one or more intake ports 114, and deliver the intake air to the engine component 102. In another example, the engine air passage 116 includes one or more frame components 202 of the frame 200 of the vehicle 100. That is to say, the engine air passage 116 is provided within the frame component 202 and the frame component accordingly doubles as a portion of the frame as well as a portion of the intake system 112 further described herein (as well as the other exemplary intake systems described herein).

At 1110, the method 1100 optionally includes attenuating engine noise from the engine component at least at a vehicle cabin, such as the vehicle cabin 106 of the vehicle 100. In an example, attenuating noise includes directing engine noise through each of the one or more intake ports 114 away from the vehicle cabin 106 of the vehicle 100. In one example, engine noise is attenuated with the intake system, for instance the intake system 112 shown in FIG. 3B, by directing engine noise through the intake system 112 in a tortuous path. The tortuous path includes, in an example, the intake duct 118, the engine air passage 116 or the like. The tortuous passage of the engine noise through the intake system 112 attenuates (e.g., minimizes) noise generated by the engine components 102 and otherwise delivered from the intake system. In another example, a component is included in the intake system, for instance, as shown in the intake system 900 provided in FIG. 9 including an intake attenuator 912. In one example, the intake attenuator 912 includes a resonator configured to provide engine noise out of phase relative to noise otherwise delivered through the intake ports such as the intake ports 906. The out of phase engine noise interferes with the engine noise delivered from the intake ports 906 and accordingly further decreases the noise profile of the vehicle 100. In another example, the intake ports 906 are differently spaced from a first location, such as the duct port 908. The differing spacing is optionally configured (e.g., in the manner of a resonator) to deliver engine noise rom one of the ports 906 out of phase (and thereby interfering) relative to the engine noise form the other port. Optionally, one or more attenuators (including resonators) are included in one or more of the engine air passage 904, at or near the intake ports 906 or the like.

In another example, the intake ports 114, for instance, shown in FIG. 3B are provided to either side of the vehicle, for instance, to either side of the vehicle cabin 106 shown in FIG. 3B. The intake ports 114, as shown, are directed away from the vehicle cabin 106 and accordingly distribute noise from the vehicle 100 in an outward fashion away from one or more of the rider, driver, passengers or the like. In another example, the intake ports 114 are provided forward of the vehicle cabin 106. By providing the intake ports 114 outwardly relative to the vehicle cabin 106 and directing noise away from the vehicle 100 the noise profile of the vehicle 100 is decreased (at least) for the driver and rider.

Several options for the method 1100 follow. In one example, the method 1100 includes spacing the first and second intake ports from the intake duct 118, for instance, the intake port 208 of the intake duct 118 to accordingly minimize the amount of particulate otherwise received through the intake ports 114 and delivered to the intake duct 118. In another example, one or more port screens, such as the port screens 910 shown in FIG. 9, are included with the intake ports or near the intake ports 906 to accordingly screen and thereby remove particulate prior to delivery through the intake system, such as the intake system 900 shown in FIG. 9.

In another example, receiving air at the first intake port and receiving air at the second intake port includes, in one example, receiving air at a first side, for instance, a first side of the vehicle 108 shown in FIG. 1, and a second side such as the second side 110 also shown in FIG. 1. As shown in FIG. 1, in one example, receiving air at the first intake port 114 includes, in one example, receiving air at the first side 108 and at a position in front of a vehicle cabin, such as the vehicle cabin 106. Similarly, receiving air at the second intake port 114 at the second position, in one example, includes receiving air at the second side 110 of the vehicle 100 and at a positon in front of the vehicle cabin 106. As previously described herein, in other examples, the differing locations of the intake ports 114 are, in one example, provided on the same side (but spaced apart) including one or more of the sides of the vehicle, top, bottom of the vehicle, within the vehicle 100 or the like.

In another example, inputting air to the engine component, such as one or more engine components 102, includes diverting air around at least one fouling shield 800 as shown, for instance, in FIG. 8A. The fouling shield 800 is, in one example, provided over one or more of the intake ports 114. In one example, the fouling shield 800 is a component of the body and extends over the intake port 114 to provide a shield configured to intercept particulate, snow, water, mud or the like otherwise delivered to the intake port 114. In another example, the fouling shield 800 is a separate component from the body, for instance, a component of the vehicle such as the frame, a plate or the like provided over the intake port 114. The fouling shield 800 prevents (e.g., entirely prevents or minimizes) the ingress of particulate to at least one of the first and second intake ports 114.

In another example, attenuating noise from the engine component, for instance, one or more engine components 102 includes directing engine noise from the engine component 102 through at least one frame component 202. For instance, in one example, such as that shown in FIGS. 2, 3A, B, the frame component 202, in one example, is a component of the intake system 112 and accordingly provides additional length to the intake system to further attenuate noise otherwise generated by the engine components 102. Further, the frame component 202, in one example directs engine noise away from the vehicle cabin 106 (accordingly to the configuration of the intake ports) and correspondingly away from the driver and rider. In another example, attenuating engine noise from the engine component 102 includes directing engine noise from the engine component near a rear portion of the vehicle 122 toward a front portion 120 of the vehicle through an intake duct, such as the intake duct 118 shown in FIGS. 1 and 2. The method further includes directing engine noise from the intake duct 118 toward at least one frame component 202 in communication with the first and second intake ports 114. The at least one frame component 202 as described herein directs air from the first and second intake ports toward the engine component, for instance, by way of the intake duct 118 in communication with the frame component 202.

In still another example, attenuating engine noise from the one or more engine components 102 includes directing engine noise around or through at least one fouling shield such as the fouling shield 800 shown in FIGS. 8A, 8B. As previously described herein, the fouling shields 800, in one example, extend over the one or more intake ports 114 and intercept and muffle noise delivered from the intake ports 114 and thereby minimize the noise profile.

Various Notes & Examples

Example 1 can include subject matter, such as can include a vehicle including an air intake system for an engine component comprising: a vehicle frame including one or more frame components, at least one of the one or more frame components includes: an engine air passage, at least one intake port in communication with the engine air passage, and at least one duct port in communication with the engine air passage; an engine component coupled with the vehicle frame; and an intake duct extending from the at least one duct port to the engine component.

Example 2 can include, or can optionally be combined with the subject matter of Example 1, to optionally include wherein the engine component includes one or more of an engine or a continuous variable transmission.

Example 3 can include, or can optionally be combined with the subject matter of one or any combination of Examples 1 or 2 to optionally include two or more ground engaging members coupled with the vehicle frame and operably coupled with the engine component.

Example 4 can include, or can optionally be combined with the subject matter of one or any combination of Examples 1-3 to optionally include wherein the at least one intake port is at an end of the frame component.

Example 5 can include, or can optionally be combined with the subject matter of one or any combination of Examples 1-4 to optionally include wherein the at least one intake port of the frame component includes first and second intake ports, each of the first and second intake ports in communication with the engine component.

Example 6 can include, or can optionally be combined with the subject matter of Examples 1-5 to optionally include wherein the first intake port is spaced from the at least one duct port by a first portion of the engine air passage, and the second intake port is spaced from the least one duct port by a second portion of the engine air passage.

Example 7 can include, or can optionally be combined with the subject matter of Examples 1-6 to optionally include wherein the first intake port is at a first position on the vehicle and the second intake port is at a second position on the vehicle, the first position different from the second position.

Example 8 can include, or can optionally be combined with the subject matter of Examples 1-7 to optionally include wherein the first position is at a first side of the vehicle, and the second position is at a second side of the vehicle opposed to the first side.

Example 9 can include, or can optionally be combined with the subject matter of Examples 1-8 to optionally include wherein the one or more frame components includes a frame component extending between first and second sides of the vehicle, and the first intake port is at the first side and the second intake port is at the second side, the second side opposed to the first side.

Example 10 can include, or can optionally be combined with the subject matter of Examples 1-9 to optionally include wherein the at least one intake port is positioned outside and forward of a vehicle cabin of the vehicle.

Example 11 can include, or can optionally be combined with the subject matter of Examples 1-10 to optionally include a fouling shield extending over the at least one intake port, the fouling shield is spaced from the at least one intake port and configured to allow air flow into the at least one intake port.

Example 12 can include, or can optionally be combined with the subject matter of Examples 1-11 to optionally include a vehicle including an air intake system for a continuous variable transmission comprising: a vehicle frame including one or more frame components, at least one of the one or more frame components includes: an engine air passage, at least one intake port in communication with the engine air passage, and at least one duct port in communication with the engine air passage; a continuous variable transmission coupled with the vehicle frame; and an intake duct extending from the at least one duct port to the continuous variable transmission.

Example 13 can include, or can optionally be combined with the subject matter of Examples 1-12 to optionally include wherein the at least one intake port includes: a first intake port at a first side of the vehicle outside of a vehicle cabin, and a second intake port at a second side of the vehicle outside of the vehicle cabin, the first and second sides are different.

Example 14 can include, or can optionally be combined with the subject matter of Examples 1-13 to optionally include wherein the first intake port is directed outwardly from the first side and the first intake port is forwardly positioned relative to the vehicle cabin, and the second intake port is directed outwardly from the second side and the second intake port is forwardly positioned relative to the vehicle cabin.

Example 15 can include, or can optionally be combined with the subject matter of Examples 1-14 to optionally include wherein the frame component of the at least one or more frame components is positioned in front of the vehicle dashboard and at an elevation proximate the vehicle dashboard.

Example 16 can include, or can optionally be combined with the subject matter of Examples 1-15 to optionally include wherein the at least one intake port is at an elevation proximate the vehicle dashboard.

Example 17 can include, or can optionally be combined with the subject matter of Examples 1-16 to optionally include a vehicle including an air intake system for an engine component comprising: a plurality of intake ports at differing locations on a vehicle, the plurality of intake ports includes at least first and second intake ports: the first intake port is at a first position on a side of the vehicle outside of a vehicle cabin, and the second intake port is at a second position on another side of the vehicle outside of the vehicle cabin, the second position different from the first position; an engine component coupled with the vehicle; and an intake duct extending from the engine component, the intake duct is in communication with each of the first and second intake ports, and each of the first and second intake ports is in communication with the engine component through the intake duct.

Example 18 can include, or can optionally be combined with the subject matter of Examples 1-17 to optionally include wherein the plurality of intake ports are in one or more frame components of a vehicle frame, and the one or more frame components include at least one engine air passage and at least one duct port, and the intake duct is in communication with the plurality of intake ports through the at least one engine air passage and the at least one duct port.

Example 19 can include, or can optionally be combined with the subject matter of Examples 1-18 to optionally include wherein the first intake port is spaced from the at least one duct port by a first portion of the engine air passage, and the second intake port is spaced from the least one duct port by a second portion of the engine air passage.

Example 20 can include, or can optionally be combined with the subject matter of Examples 1-19 to optionally include wherein the at least one duct port is interposed between the first intake port and the second intake port.

Example 21 can include, or can optionally be combined with the subject matter of Examples 1-20 to optionally include wherein the first position of the first intake port is at a first side of the vehicle, and the second position of the second intake port is at a second side of the vehicle opposed to the first side.

Example 22 can include, or can optionally be combined with the subject matter of Examples 1-21 to optionally include wherein a composite port cross sectional area of the first and second intake ports is greater than or equal to a duct cross sectional area of the intake duct.

Example 23 can include, or can optionally be combined with the subject matter of Examples 1-22 to optionally include wherein the first and second intake ports are directed away from a vehicle cabin of the vehicle.

Example 24 can include, or can optionally be combined with the subject matter of Examples 1-23 to optionally include wherein the first and second locations of the first and second intake ports are outside of a vehicle cabin of the vehicle.

Example 25 can include, or can optionally be combined with the subject matter of Examples 1-24 to optionally include wherein the first and second locations of the first and second intake ports are forward of a vehicle cabin of the vehicle.

Example 26 can include, or can optionally be combined with the subject matter of Examples 1-25 to optionally include wherein the engine component includes one or more of an engine or a continuous variable transmission.

Example 27 can include, or can optionally be combined with the subject matter of Examples 1-26 to optionally include a first fouling shield extending over the first intake port, a second fouling shield extending over the second intake port, and the first and second fouling shields are spaced from the first and second intake ports, respectively, to allow air flow into the first and second intake ports.

Example 28 can include, or can optionally be combined with the subject matter of Examples 1-27 to optionally include wherein the first and second fouling shields are included in one or more body panels of the vehicle.

Example 29 can include, or can optionally be combined with the subject matter of Examples 1-28 to optionally include a method of inputting air to an engine component and attenuating noise from the engine component comprising: inputting air to the engine component including: receiving air at a first intake port at a first position on a side of a vehicle, receiving air at a second intake port at a second position on another side of the vehicle, the second position different than the first position, and directing the air received at the first and second intake ports to an engine component; and attenuating engine noise from the engine component at least at a vehicle cabin of the vehicle, attenuating including directing the engine noise through each of the first and second intake ports away from a vehicle cabin of the vehicle.

Example 30 can include, or can optionally be combined with the subject matter of Examples 1-29 to optionally include wherein inputting air to the engine component includes directing air from the first and second intake ports through at least one frame component of the vehicle frame.

Example 31 can include, or can optionally be combined with the subject matter of Examples 1-30 to optionally include wherein inputting air to the engine component includes directing air from the at least one frame component through an intake duct coupled with the engine component.

Example 32 can include, or can optionally be combined with the subject matter of Examples 1-31 to optionally include wherein the first and second intake ports are spaced from the intake duct by the at least one frame component, and inputting air to the engine component includes preventing the ingress of particulate to the engine component according to the spacing of the first and second intake ports from the intake duct by the at least one frame component.

Example 33 can include, or can optionally be combined with the subject matter of Examples 1-32 to optionally include wherein receiving air at the first intake port at the first position includes receiving air at a first side of the vehicle, and receiving air at the second intake port at the second position includes receiving air at a second side of the vehicle opposed to the first side.

Example 34 can include, or can optionally be combined with the subject matter of Examples 1-33 to optionally include wherein receiving air at the first intake port at the first position includes receiving air at the first side of the vehicle outside of and in front of a vehicle cabin, and receiving air at the second intake port at the second position includes receiving air at the second side of the vehicle outside of an in front of the vehicle cabin.

Example 35 can include, or can optionally be combined with the subject matter of Examples 1-34 to optionally include wherein directing the air received at the first and second intake ports to the engine component includes directing the air to the engine component including one or more of a continuous variable transmission or an engine.

Example 36 can include, or can optionally be combined with the subject matter of Examples 1-35 to optionally include wherein inputting air to the engine component includes: diverting air around at least one fouling shield extending over at least one of the first and second intake ports, and preventing the ingress of particulate to at least one of the first and second intake ports with the at least one fouling shield.

Example 37 can include, or can optionally be combined with the subject matter of Examples 1-36 to optionally include wherein attenuating engine noise from the engine component includes directing engine noise from the engine component through at least one frame component, the at least one frame component directs air from the first and second intake ports toward the engine component. Example 38 can include, or can optionally be combined with the subject matter of Examples 1-37 to optionally include wherein attenuating engine noise from the engine component includes: directing engine noise from the engine component near a rear portion of the vehicle to a front portion of the vehicle through an intake duct, and directing engine noise from the intake duct toward at least one frame component in communication with the first and second intake ports, the at least one frame component directs air from the first and second intake ports toward the engine component.

Example 39 can include, or can optionally be combined with the subject matter of Examples 1-38 to optionally include wherein the first intake port is at the first position on a first side of the vehicle, and the second intake port is at the second position on a second side of the vehicle different from the first side, and attenuating engine noise from the engine component includes directing engine noise through the first and second intake ports including: directing engine noise away from the first side with the first intake port, and directing engine noise away from the second side with the second intake port.

Example 40 can include, or can optionally be combined with the subject matter of Examples 1-39 to optionally include wherein attenuating engine noise from the engine component includes directing engine noise around at least one fouling shield extending over at least one of the first or second intake ports. Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A vehicle, comprising:
a vehicle shell including a vehicle cabin and a vehicle frame, the vehicle shell defining a passenger compartment and an engine compartment, wherein a first pillar of the vehicle shell includes at least one of a vertically extending component of the vehicle frame and a vertically extending portion of the vehicle cabin;
a first engine component positioned at least partially within the engine compartment;
two or more ground engaging members operably coupled with the first engine component; and
an airflow system in fluidic communication with the first engine component, wherein the airflow system includes:
a primary duct defining at least a portion of an air passageway through which air flows towards the first engine component;
a first duct coupled with the primary duct and defining a portion of the air passageway;
a first port fluidically connected with the first duct, wherein the first port is positioned outboard of the first pillar, and wherein the first duct extends from the first port toward the primary duct; and
a noise control mechanism extending from the primary duct.

2. The vehicle of claim 1, wherein the noise control mechanism is an attenuator.

3. The vehicle of claim 2, wherein the noise control mechanism extends perpendicularly from the primary duct.

4. The vehicle of claim 3, wherein the first duct extends down the first pillar.

5. The vehicle of claim 4, wherein the noise control mechanism is positioned lower and rearward of the first port.

6. The vehicle of claim 1, wherein the noise control mechanism includes a resonator, the resonator being configured to provide noise out of phase relative to noise otherwise delivered through the primary duct.

7. The vehicle of claim 6, wherein the out of phase noise interferes with the noise otherwise delivered through the primary duct such that the resonator decreases a noise profile of the vehicle.

8. The vehicle of claim 1, wherein a portion of the primary duct is non-linear, thereby defining a tortuous portion of the air passageway, the tortuous portion of the air passageway being configured to reduce a noise profile of the vehicle.

9. The vehicle of claim 1, wherein the first engine component includes one or more of a continuous variable transmission or an engine.

10. The vehicle of claim 1, wherein a second pillar of the vehicle shell comprises at least one of a vertically extending component of the vehicle frame and a vertically extending portion of the vehicle cabin, the first pillar being associated with a first side of the vehicle and the second pillar being associated with an opposed second side of the vehicle.

11. The vehicle of claim 10, wherein the airflow system further comprises: first and second ports positioned outboard of respective first and second pillars; and first and second ducts extending from respective first and second ports, each of the first and second ducts extending towards the primary duct, and each of the first and second ducts defining respective first and second portions of the air passageway.

12. The vehicle of claim 11, the airflow system further comprising: a third port positioned outboard of the second pillar; and a third duct extending from the third port towards a second engine component.

13. A side-by-side recreational off-highway vehicle having two front wheels and two rear wheels, the vehicle comprising:
a chassis including:
a front portion operatively coupled to the front wheels;
a rear portion operatively coupled to the rear wheels; and
a middle portion defining a vehicle cabin including one or more seats, the middle portion positioned between the front and rear portions of the chassis;
an engine positioned in the rear portion of the chassis;
a continuous variable transmission ("CVT") operably connected to the engine, the CVT comprising a housing ("CVT housing") including an air inlet ("CVT air inlet");
an air intake port positioned outboard of the vehicle cabin, the air intake port being in fluid communication with the CVT air inlet; and
a noise control mechanism in fluid communication with the air intake port and the CVT air inlet, wherein the noise control mechanism comprises at least one attenuator or at least one resonator, and wherein the noise control mechanism is positioned downstream of the air intake port and upstream of the CVT air inlet.

14. The vehicle of claim 13, wherein the air intake port is directed away from the vehicle cabin.

15. The vehicle of claim 13, wherein the noise control mechanism and the CVT housing are each positioned on a first side of the vehicle.

16. The vehicle of claim 15, wherein the noise control mechanism comprises a resonator positioned vertically lower than an uppermost portion of the CVT housing.

17. The vehicle of claim 16, wherein a bottom portion of the resonator is positioned lower than an uppermost surface of a rear tire, the rear tire being coupled to a first rear wheel of the two rear wheels, the first rear wheel being positioned on the first side of the vehicle.

18. The vehicle of claim 17, wherein the entire resonator is positioned lower than the uppermost surface of the rear tire.

19. The vehicle of claim 13, further comprising a fouling shield extending over at least a portion of the air intake port.

20. The vehicle of claim 13, further comprising an air filter in fluid communication with the air intake port, wherein the air intake port is positioned entirely forward of the air filter.

21. The vehicle of claim 13, wherein the air intake port is defined in a body panel of the vehicle.

22. The vehicle of claim 21, wherein the chassis includes a lower frame and a vertical frame member extending from the lower frame, wherein the vertical frame member partially defines the vehicle cabin, and wherein the air intake port is positioned along an upper end of the vertical frame member.

23. The vehicle of claim 22, wherein the vertical frame member partially defines a door opening to a passenger compartment of the vehicle cabin, wherein a door is positioned in the opening when in the closed position, wherein the door includes a door handle, and wherein the air intake port is positioned vertically higher than the door handle.

* * * * *